US011978237B2

(12) United States Patent
Tanigawa

(10) Patent No.: US 11,978,237 B2
(45) Date of Patent: May 7, 2024

(54) ANNOTATION ASSISTING METHOD, ANNOTATION ASSISTING DEVICE, AND RECORDING MEDIUM HAVING ANNOTATION ASSISTING PROGRAM RECORDED THEREON

(71) Applicant: Panasonic Intellectual Property Corporation of America, Torrance, CA (US)

(72) Inventor: Toru Tanigawa, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 267 days.

(21) Appl. No.: 16/992,730

(22) Filed: Aug. 13, 2020

(65) Prior Publication Data

US 2021/0056346 A1 Feb. 25, 2021

(30) Foreign Application Priority Data

Aug. 21, 2019 (JP) .................... 2019-150938

(51) Int. Cl.
*G06N 20/00* (2019.01)
*G06F 18/2431* (2023.01)
(Continued)

(52) U.S. Cl.
CPC .......... *G06V 10/25* (2022.01); *G06F 18/2431* (2023.01); *G06F 18/40* (2023.01);
(Continued)

(58) Field of Classification Search
CPC ........ G06N 3/08; G06N 3/0454; G06N 20/00; G06N 3/084; G06N 3/0464; G06N 3/096;
(Continued)

(56) References Cited

U.S. PATENT DOCUMENTS 10,719,301 B1* 7/2020 Dasgupta ............ G06F 11/3688
2016/0196250 A1* 7/2016 Allen .................... G06F 16/285
715/230
(Continued)

FOREIGN PATENT DOCUMENTS

JP 2014-502176 1/2014
WO 2012/061452 5/2012

OTHER PUBLICATIONS

Castrejon et al., Annotating Object Instances with a Polygon-RNN, Apr. 18, 2017 [retrieved Jul. 11, 2022], Cornell University: arXiv [open-access archive], 9 pages. Retrieved: https://arxiv.org/abs/1704.05548 (Year: 2017).*

*Primary Examiner* — Matthew C Bella
*Assistant Examiner* — Dennis Rosario
(74) *Attorney, Agent, or Firm* — Greenblum & Bernstein, P.L.C.

(57) ABSTRACT

Speed of first work is compared with speed of second work based on a first working period when a worker is caused to perform the first work of setting annotation data to first image data and a second working period when the worker is caused to perform the second work of correcting advance annotation data set based on a recognition result obtained by causing a predetermined recognizer to recognize the first image data, and, in a case where the first work is faster than the second work, the worker is requested to correct second image data in which advance annotation data is not set, while, in a case where the second work is faster than the first work, the worker is requested to correct advance annotation data set based on a recognition result obtained by causing the recognizer to recognize the second image data.

8 Claims, 26 Drawing Sheets

(51) Int. Cl.
*G06F 18/40* (2023.01)
*G06V 10/25* (2022.01)
*G06V 10/70* (2022.01)
*G06V 10/778* (2022.01)
*G06V 20/00* (2022.01)
*G06V 30/19* (2022.01)

(52) U.S. Cl.
CPC .............. *G06N 20/00* (2019.01); *G06V 10/70* (2022.01); *G06V 10/7788* (2022.01); *G06V 20/00* (2022.01); *G06V 30/19133* (2022.01)

(58) Field of Classification Search
CPC .......... G06N 3/042; G06N 3/088; G06N 3/09; G06N 20/20; G06N 3/0895; G06N 5/04; G06N 5/046; G06N 5/048; G06N 5/042; G06V 10/82; G06V 10/454; G06V 10/25; G06V 2201/03; G06V 20/70; G06V 10/70; G06V 10/7784; G06V 10/7788; G06V 10/7792; G06V 10/778; G06V 10/7753; G06V 10/774; G06V 10/98; G06V 10/987; G06V 10/993; G06V 10/225; G06V 30/19167; G06V 30/19133; G06V 10/945; G06V 20/58; G06V 40/23; G06V 10/255; G06V 2201/10; G06V 20/582; G06V 20/584; G06V 20/586; G06V 20/588; G06V 30/153; G06V 40/28; G06V 2201/05; G06V 2201/09; G06V 30/19; G06V 40/25; G06V 30/199; G06V 30/20; G06V 40/00; G06V 2201/06; G06T 2207/20084; G06T 2207/20081; G06T 7/11; G06T 7/0012; G06T 2200/24; G06T 2219/004; G06T 2210/12; G06T 2207/30204; G06T 2207/20092; G06K 9/6256; G06K 9/6267; G06K 9/6262; G06K 9/6263; G06K 9/6264; G06K 9/6253; G06K 9/6254; G06F 40/169; G06F 3/04842; G06F 18/214; G06F 18/2155; G06F 18/217; G06F 18/2178; G06F 18/2185; G06F 18/41; G06F 18/40; G06F 16/24573; G06F 18/21; G06F 40/279; G06F 30/27; A61B 8/468; A61B 8/465; A61B 8/469

See application file for complete search history.

(56) References Cited

U.S. PATENT DOCUMENTS

2019/0294970 A1* 9/2019 Fidler .................. G06V 10/454
2020/0380312 A1* 12/2020 Khan .................. G06K 9/6267

* cited by examiner

FIG.6

| IDENTIFIER OF RECOGNIZER:AAA | |
|---|---|
| FIRST WORKING PERIOD | SECOND WORKING PERIOD |
| xxx | xxx |

FIG.14

| IDENTIFIER OF RECOGNIZER: AAA | | | | |
|---|---|---|---|---|
| FIRST THRESHOLD | TH1_1 | TH1_2 | ... | TH1_n |
| SECOND WORKING PERIOD | xxx | xxx | | xxx |

| IDENTIFIER OF RECOGNIZER: AAA | |
|---|---|
| FIRST WORKING PERIOD | |
| xxx | |

FIG.18

| IDENTIFIER OF RECOGNIZER: AAA | | | | |
|---|---|---|---|---|
| SECOND THRESHOLD INFORMATION | TH2_1 | TH2_2 | ... | TH2_n |
| SECOND WORKING PERIOD | xxx | xxx | | xxx |

| IDENTIFIER OF RECOGNIZER: AAA | |
|---|---|
| FIRST WORKING PERIOD | |
| xxx | |

FIG.22

IDENTIFIER OF
RECOGNIZER:AAA  CLASS:Y1

| THIRD THRESHOLD | TH3_1 | TH3_2 | ... | TH3_n |
|---|---|---|---|---|
| SECOND WORKING PERIOD | xxx | xxx | | xxx |

IDENTIFIER OF
RECOGNIZER:AAA  CLASS:Y2

| THIRD THRESHOLD | TH3_1 | TH3_2 | ... | TH3_n |
|---|---|---|---|---|
| SECOND WORKING PERIOD | xxx | xxx | | xxx |

IDENTIFIER OF
RECOGNIZER:AAA

| FIRST WORKING PERIOD |
|---|
| xxx |

FIG.26

IDENTIFIER OF RECOGNIZER: AAA

| IMAGE CAPTURING SCENE | Z1 | Z2 | ... | Zn |
|---|---|---|---|---|
| FIRST WORKING PERIOD | xxx | xxx | | xxx |
| SECOND WORKING PERIOD | xxx | xxx | | xxx |

ANNOTATION ASSISTING METHOD, ANNOTATION ASSISTING DEVICE, AND RECORDING MEDIUM HAVING ANNOTATION ASSISTING PROGRAM RECORDED THEREON

FIELD OF THE INVENTION

The present disclosure relates to a technique in which a computer mists a worker to perform work of setting annotation data to image data.

BACKGROUND ART

To generate a recognizer for recognizing an object with high accuracy, it is necessary to generate a recognizer by causing the recognizer to learn a large amount of good-quality data with a learning model. The learning data includes, for example, image data, region information indicating a region including a recognition target within the image data, and a class label indicating a class of the recognition target. The region information and the class label are called annotation data, and are normally manually set by a worker.

However, to generate a recognizer with high accuracy, it is said that a hundred thousand to a million pieces of learning data are required, and if all the setting work of these pieces of annotation data is manually performed, it involves enormous time and cost.

Prior at documents relating to the present disclosure include JP 2014-502176 A. JP 2014-502176 A discloses a technique of automatically identifying a plurality of measurement elements for a digital medical image and providing the measurement elements to a user, and, in a case where the user corrects the measurement elements, computing final geometric features based on the measurement elements corrected by the user, while, in a case where the user does not correct the measurement elements, computing final geometric features based on the automatically identified measurement elements.

However, JP 2014-502176 A assumes a case where measurement elements are recognized from a digital medical image using a recognizer and provided to a user, so as to cause the user to perform correction work, and does not take into account a case where the user is caused to perform work of recognizing measurement elements from the beginning. Therefore, in order to reduce work cost to be spent for annotation work in JP 2014-502176 A, further improvement is required.

SUMMARY OF THE INVENTION

The present disclosure has been made to solve such a problem and is directed to providing a technique for reducing work cost to be spent for work of setting annotation data.

An aspect of the present disclosure is an annotation assisting method in which a computer assists a worker to perform work of setting annotation data to image data, the annotation assisting method including, measuring a first working period when the worker is caused to perform first work of setting the annotation data to first image data and recording the first working period in a memory, measuring a second working period when the worker is caused to perform second work of correcting advance annotation data set for the advance annotation data set based on a recognition result obtained by causing a predetermined recognizer to recognize the first image data and recording the second working period in the memory, comparing speed of the first work with speed of the second work based on the first working period and the second working period recorded in the memory, in a case where the first work is faster than the second work, requesting the worker to set the annotation data to second image data in which the advance annotation data is not set, and in a case where the second work is faster than the first work, requesting the worker to correct the advance annotation data set based on a recognition result obtained by causing the recognizer to recognize the second image data.

BRIEF DESCRIPTION OF THE DRAWINGS

FIG. 6 is a view illustrating an example of a data configuration of the analysis data in the first embodiment;

FIG. 14 is a view illustrating an example of the analysis data in the second embodiment;

FIG. 18 is a view illustrating an example of the analysis data in the third embodiment;

FIG. 22 is a view illustrating an example of the analysis data in the fourth embodiment;

FIG. 26 is a view illustrating an example of the analysis data in the fifth embodiment.

Figure 1:
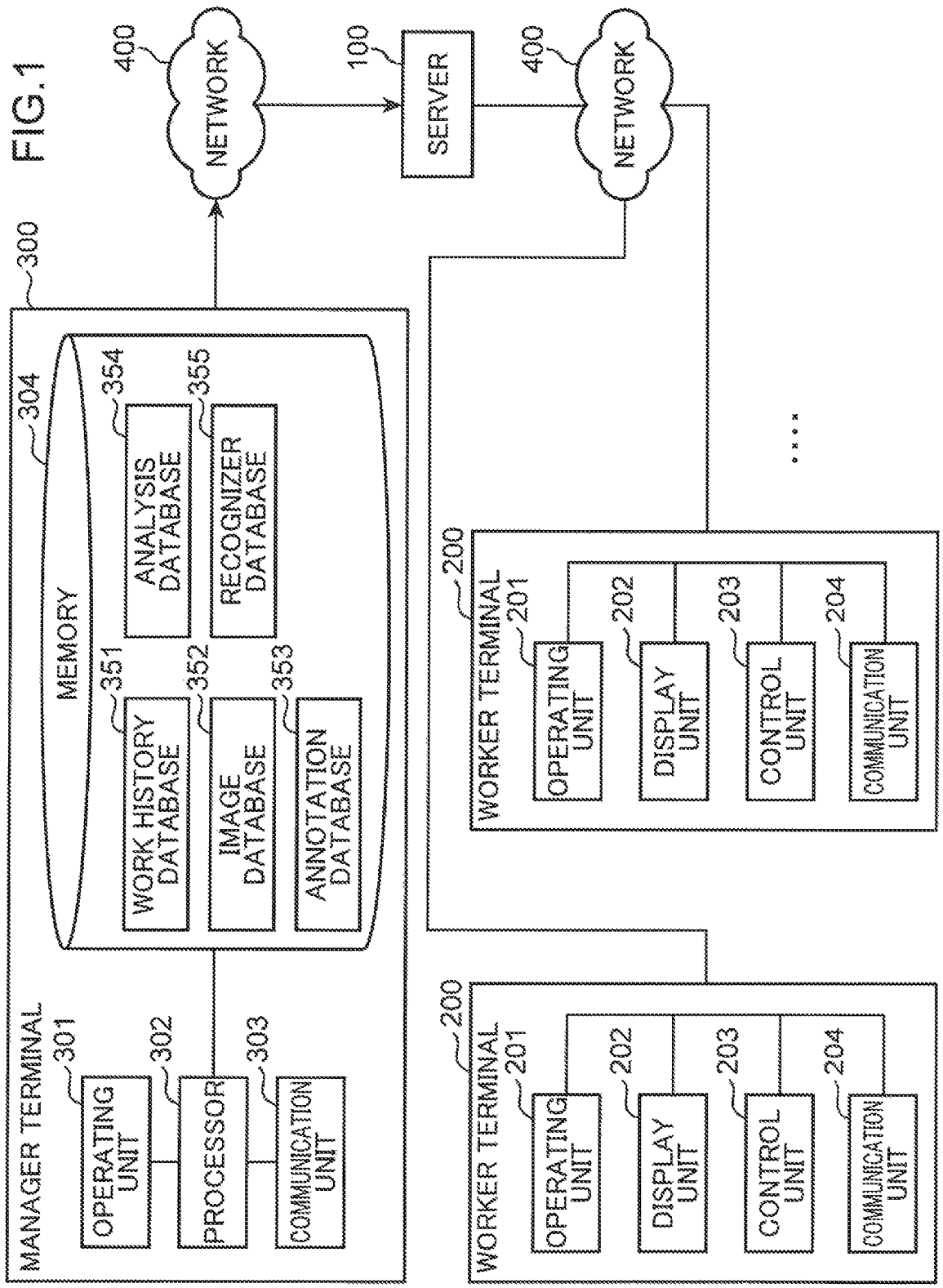
FIG. 1 is a block diagram illustrating an example of an overall configuration of an annotation system according to a first embodiment of the present disclosure.

DESCRIPTION OF EMBODIMENTS (Background of the Present Disclosure)

The present inventor has studied a technique of efficiently generating learning data which is required for generating a recognizer which recognizes a recognition target such as a car and a human with high accuracy from image data. As the learning data, image data in which annotation data is set as described above is used. In a case where such learning data is manually generated, a worker finds a recognition target such as a car and a human from an image displayed on a display, operates an input device such as a mouse to perform operation of setting region information indicating a region including the object, and performs operation of setting a class label indicating a class of the object. It is said that a hundred thousand to a million pieces of learning data are required for machine learning by the recognizer, including deep learning. Therefore, it is not easy to manually generate such a large amount of learning data.

However, in recent years, by widespread use of cloud-sourcing service, it has become possible to secure a large amount of manpower from overseas as well as in the country, and it has become possible to generate teaming data at low cost by using such manpower.

Further, a method of semi-automatic annotation has been also studied in which learning data is generated by image data in which advance annotation data set based on a recognition result obtained by causing a recognizer to recognize image data has been set, being displayed on a display, and a worker being caused to perform work of correcting the advance annotation data.

It is therefore expected that learning data can be generated at further lower cost by combination of the method of semi-automatic annotation and cloud-sourcing service.

Therefore, the present inventor has specifically studied a method for generating learning data using semi-automatic annotation. Then, it has been found that, in a case where recognition accuracy of a recognizer to be used for semi-automatic annotation is low, it takes longer time for work of correcting advance annotation data, and a working period becomes rather shorter if the worker sets annotation data from the beginning. Therefore, knowledge could be obtained that semi-automatic annotation is not necessarily an optimal solution in generation of learning data.

The present disclosure has been made based on such knowledge, and is directed to providing a technique for reducing work cost to be spent for annotation work.

An aspect of the present disclosure is an annotation assisting method in which a computer assists a worker to perform work of setting annotation data to image data, the annotation assisting method including, measuring a first working period when the worker is caused to perform first work of setting the annotation data to first image data and recording the first working period in a memory, measuring a second working period when the worker is caused to perform second work of correcting advance annotation data for the advance annotation data set based on a recognition result obtained by causing a predetermined recognizer to recognize the first image data and recording the second working period in the memory, comparing speed of the first work with speed of the second work based on the first working period and the second working period recorded in the memory, in a case where the first work is faster than the second work, requesting the worker to set the annotation data to second image data in which the advance annotation data is not set, and in a case where the second work is faster than the first work, requesting the worker to correct the advance annotation data set based on a recognition result obtained by causing the recognizer to recognize the second image data.

In this configuration, a first working period which is an actual working period when a worker performs first work of setting annotation data to first image data in which advance annotation data is not set, and a second working period which is an actual working period when the worker performs second work of correcting advance annotation data set based on a recognition result obtained by causing a recognizer to recognize the first image data, am measured. Then, speed of the first work is compared with speed of the second work based on the measured first working period and second working period, and, in a case where it is determined that the first work is faster, the worker is requested to set annotation data to second image data in which advance annotation data is not set. Meanwhile, in a case where it is determined that the second work is faster, the worker is requested to correct advance annotation data set to the second image data.

In this manner, according to this aspect, in a case where work is performed faster if the worker performs work of setting annotation data from the beginning without utilizing a recognition result by a predetermined recognizer, the worker performs annotation work of setting annotation data to image data in which advance annotation data is not set. Meanwhile, in a case where work is performed faster if the worker performs work of correcting advance annotation data set based on the recognition result of the image data, the worker performs annotation work of correcting advance annotation data. As a result, according to this aspect, it is possible to reduce a working period and work cost such as personnel cost to be spent for annotation work.

In the above aspect, the advance annotation data may be set in a case where a value of reliability of a recognition result output by the recognizer along with the recognition result is equal to or greater than a first threshold, in the measurement of the second working period, a plurality of first thresholds are set, and the second working period is measured for each of the plurality of first thresholds and recorded in the memory, an optimal value of the first threshold is further determined based on the second working period measured for each of the plurality of first thresholds, in the comparison of the speed, the speed is compared based on the second working period corresponding to the optimal value of the first threshold and the first working period, and in the request for correction of the advance annotation data, the advance annotation data is set using the optimal value of the first threshold.

According to this configuration, the second working period is measured while a first threshold which is to be used for determination as to whether or not to set advance annotation data to a recognition target and which is to be used for comparison with reliability of the recognition result, is changed, and an optimal value of the first threshold is determined based on the measured second working period. Therefore, according to this configuration, it is possible to determine an optimal value of the first threshold which enables the second work to be efficiently performed.

Then, speed of the first work is compared with speed of the second work based on the second working period in a case where advance annotation data is set while the optimal value of the first threshold is employed and the first working period, and if the first work is faster, the worker is requested to set annotation data to the second image data in which advance annotation data is not set, while, if the second work is faster, the worker is requested to correct advance annotation data set to the second image data. Therefore, according to this configuration, since it is possible to determine work having higher work efficiency out of the first work and the second work while taking into account the first threshold regarding reliability, and cause the worker to perform the determined work, it is possible to reduce work cost for annotation work more reliably.

In the above aspect, the advance annotation data may include region information corresponding to a recognition target in an image coordinate system of the first image data or the second image data, the advance annotation data is set in a case where a size of a region indicated by the region information falls within arrange between a lower limit threshold and an upper limit threshold included in second threshold information, in the measurement of the second working period, a plurality of pieces of second threshold information are set, and the second working period is measured for each of the plurality of pieces of second threshold information and recorded in the memory, the annotation assisting method further includes determining an optimal value of the second threshold information based on the second working period measured for each of the plurality of pieces of second threshold information recorded in the memory, in the comparison of the speed, the speed is compared based on the second working period for the optimal value of the second threshold information and the first working period, and in the request for correction of the advance annotation data, the advance annotation data is set using the optimal value of the second threshold information.

According to this configuration, the second working period is measured while the second threshold information to be used for determination as to whether or not to set the region information constituting the advance annotation data to the recognition target is changed, and the optimal value of the second threshold information is determined based on the measured second working period. Therefore, according to this configuration, it is possible to determine an optimal value of the second threshold information which enables the second work to be efficiently performed.

Then, speed of the first work is compared with speed of the second work based on the second working period in a case where advance annotation data is set while the optimal value of the second threshold information is employed and the first working period, and if the first work is faster, the worker is requested to set annotation data to the second image data in which advance annotation data is not set, while, if the second work is faster, the worker is requested to correct advance annotation data set to the second image data. Therefore, according to this configuration, since it is possible to determine work having higher work efficiency out of the first work and the second work, and cause the worker to perform the determined work, it is possible to reduce work cost for annotation work more reliably.

In the above aspect, the optimal value of the first threshold may be set for each of a plurality of classes on which the recognizer is to perform recognition.

According to this configuration, the optimal value of the first threshold is set for each of a plurality of classes to be recognized by the recognizer. Therefore, according to this configuration, since it is possible to determine work having higher work efficiency out of the first work and the second work while taking into account the optimal value of the first threshold for each of the plurality of classes and cause the worker to perform the determined work, it is possible to reduce work cost for annotation work more reliably.

In the above aspect, in the measurement of the first working period, the first working period may be measured for each piece of image attribute information indicating at least one of an image capturing scene and image quality and recorded in the memory, in the measurement of the second working period, the second working period may be measured for each piece of the image attribute information and recorded in the memory, the annotation assisting method may further include specifying the image attribute information of image data on which work is to be performed, in the comparison of the speed, the speed of the first work may be compared with the speed of the second work for the image data on which work is to be performed based on the specified image attribute information, the first working period for each piece of the image attribute information recorded in the memory, and the second working period for each piece of the image attribute information recorded in the memory, in a case where the first work is faster than the second work, the worker may be requested to set the annotation data to the image data on which work is to be performed, in which the advance annotation data is not set, and in a case where the second work is faster than the first work, the worker may be requested to correct the advance annotation data set based on a recognition result obtained by causing the recognizer to recognize the image data on which work is to be performed.

According to this configuration, the first working period and the second working period are measured for each piece of image attribute information including at least one of an image capturing scene and image quality, and speed of the first work is compared with speed of the second work for each piece of image attribute information based on the measurement results. Then, it is possible to cause the worker to perform work of setting annotation data to the second image data in which advance annotation data is not set for image data on which work is to be performed, having image attribute information for which speed of the first work is faster, and cause the worker to perform work of correcting advance annotation data set for the second image data for image data on which work is to be performed, having image attribute information for which speed of the second work is faster. Therefore, according to this configuration, since it is possible to determine work having higher work efficiency out of the first work and the second work while taking into account the image attribute information and cause the worker to perform the determined work, it is possible to reduce work cost for annotation work more reliably.

In the above configuration, further, a work result of setting of the annotation data to second image data in which the advance annotation data is not set may be acquired; and a work result of correction of the advance annotation data set to the second image data may be acquired.

According to this configuration, since a work result of setting of annotation data to the second image data in which advance annotation data is not set and a work result of correction of advance annotation data set for the second image data are acquired, it is possible to easily acquire learning data for the recognizer.

It is also possible to realize the present disclosure as an annotation assisting program for causing a computer to execute characteristic respective configurations included in such an annotation assisting method, or as an annotation assisting system which operates by this annotation assisting program. Further, it goes without saying that such a computer program can be distributed via a computer readable non-transitory recording medium such as a CD-ROM or via a communication network such as the Internet.

Note that all embodiments which will be described below indicate one specific example of the present disclosure. Numerical values, shapes, components, steps, and order of the steps indicated in the following embodiments are an example, and are not intended to limit the present disclosure. Further, among the components in the following embodiments, components which are not recited in independent claims reciting generic concept will be described as arbitrary components. Further, it is also possible to combine features of the embodiments in all the embodiments.

First Embodiment

FIG. 1 is a block diagram illustrating an example of an overall configuration of an annotation system according to a first embodiment of the present disclosure. The annotation system is a system which assists a worker to perform annotation work of setting annotation data to image data. The annotation work is work performed by the worker to generate learning data to be used upon machine learning of a recognizer which is to perform learning. The worker finds a recognition target of a class determined in advance from an image presented on a display, and sets annotation data to image data by setting region information indicating a region including the recognition target and inputting a class label indicating a class of the object.

The recognition target is, for example, a human, an ordinary vehicle, a truck, a bicycle, a motorbike, or the like. The class is a type of the recognition target. The class label is text data indicating name of the class.

The worker is a human to whom operation is outsourced from a manager, and who performs work of setting annotation data to image data provided from the manager. The manager is, for example, a person who manages annotation work.

The annotation system includes a server 100 (an example of an annotation assisting device), a worker terminal 200, and a manager terminal 300. The server 100 is connected to the worker terminal 200 via a network 400 so as to be able to perform communication with each other. The server 100 is connected to the manager terminal 300 via the network 400 so as to be able to perform communication with each other. The network 400 is, for example, a wide area network such as the Internet.

The server 100 is, for example, a cloud server constituted with one or more computers. The server 100 acquires annotation data by causing image data provided from the manager terminal 300 to be displayed on the worker terminal 200, and causing the worker to perform annotation work. Details of the server 100 will be described later using FIG. 2.

The worker terminal 200 is a computer possessed by the worker. While FIG. 1 illustrates two worker terminals 200, this is an example, and there may be one worker terminal 200 or three or more worker terminals 200.

The worker terminal 200 includes an operating unit 201, a display unit 202, a control unit 203 and a communication unit 204. The operating unit 201 is, for example, an operating device such as a keyboard and a mouse. The display unit 202 is, for example, a display device such as a liquid crystal panel. The control unit 203 is, for example, an electric circuit such as a CPU. The control unit 203 causes image data on which annotation work is to be performed to be sequentially displayed on the display unit 202. The control unit 203 acquires annotation data set to the image displayed on the display unit 202 by the worker operating the operating unit 201. The communication unit 204 is a communication circuit which connects the worker terminal 200 to the network 400. The communication unit 204 transmits the annotation data acquired by the control unit 203 to the server 100. The communication unit 204 receives image data on which work is to be performed, transmitted from the server 100.

The manager terminal 300 is a computer possessed by the manager. The manager terminal 300 includes an operating unit 301, a processor 302, a communication unit 303 and a memory 304.

The operating unit 301 is, for example, an operating device such as a keyboard and a mouse, and accepts operation from the manager. The processor 302 is, for example, an electric circuit such as a CPU, and performs overall control of the manager terminal 300. The communication unit 303 is, for example, a communication circuit which connects the manager terminal 300 to the network 400. The communication unit 303 transmits, for example, image data stored in an image database 352 and configuration data of a recognizer stored in a recognizer database 355 to the server 100 under control by the processor 302. The communication unit 303 receives work history, analysis data and annotation data transmitted from the server 100.

The processor 302 causes the work history received by the communication unit 303 to be stored in a work history database 351, causes the annotation data received by the communication unit 303 to be stored in an annotation database 353, and causes the analysis data received by the communication unit 303 to be stored in an analysis database 354.

The memory 304 is a non-volatile storage device such as, for example, a hard disk drive and a solid-state drive, and includes the work history database 351, the image database 352, the annotation database 353, the analysis database 354, and the recognizer database 355.

The work history database 351 is a database which stores work history for annotation work performed by the worker. The work history is history of annotation work performed by the worker in a measurement phase which will be described later. The work history is managed by the server 100, and the manager terminal 300 causes the work history transmitted from the server 100 to be stored in the work history database 351.

The image database 352 is a database which stores image data for which annotation work is to be performed. The image data to be stored in the image database 352 is image date prepared by the manager in advance. The image data is, for example, image data obtained by capturing a scene in which a recognizer which is to perform learning recognizes an object. In a case where the recognizer which is to perform learning is mounted on a self-driving vehicle, the image data is, for example, image data indicating a traffic scene captured from a driver's seat of the self-driving vehicle.

The manager terminal 300 transmits the image data stored in the image database 352 to the server 100 and causes the image data to be stored in the server 100. The server 100 transmits the image data transmitted from the manager terminal 300 to the worker terminal 200 to present the image data to the worker, and causes the worker to perform annotation work.

The annotation database 353 is a database which stores annotation data set to the image data by the worker. The annotation data is managed by the server 100, and the annotation database 353 stores the annotation data-transmitted from the server 100.

The analysis database 354 is a database which stores analysis data generated by the server 100 analyzing work history for annotation work.

The recognizer database 355 is a database which stores configuration data of a recognizer to be used for generating advance annotation data. The recognizer is constituted with various discriminative models such as, for example, a deep neural network and support vector machine. The recognizer outputs a recognition result by recognizing an image of image data. The recognition result includes class information indicating a class label (such as a human, a car, and a motorbike), region information and reliability of the recognition result. The advance annotation data is annotation data set to the image data by an annotation setter based on the recognition result by the recognizer. Note that the recognizer to be used for annotation work may be the same as or different from the recognizer which is to perform learning. The recognizer database 355 stores configuration data of one or more recognizes which are to be used for annotation work.

Figure 2:
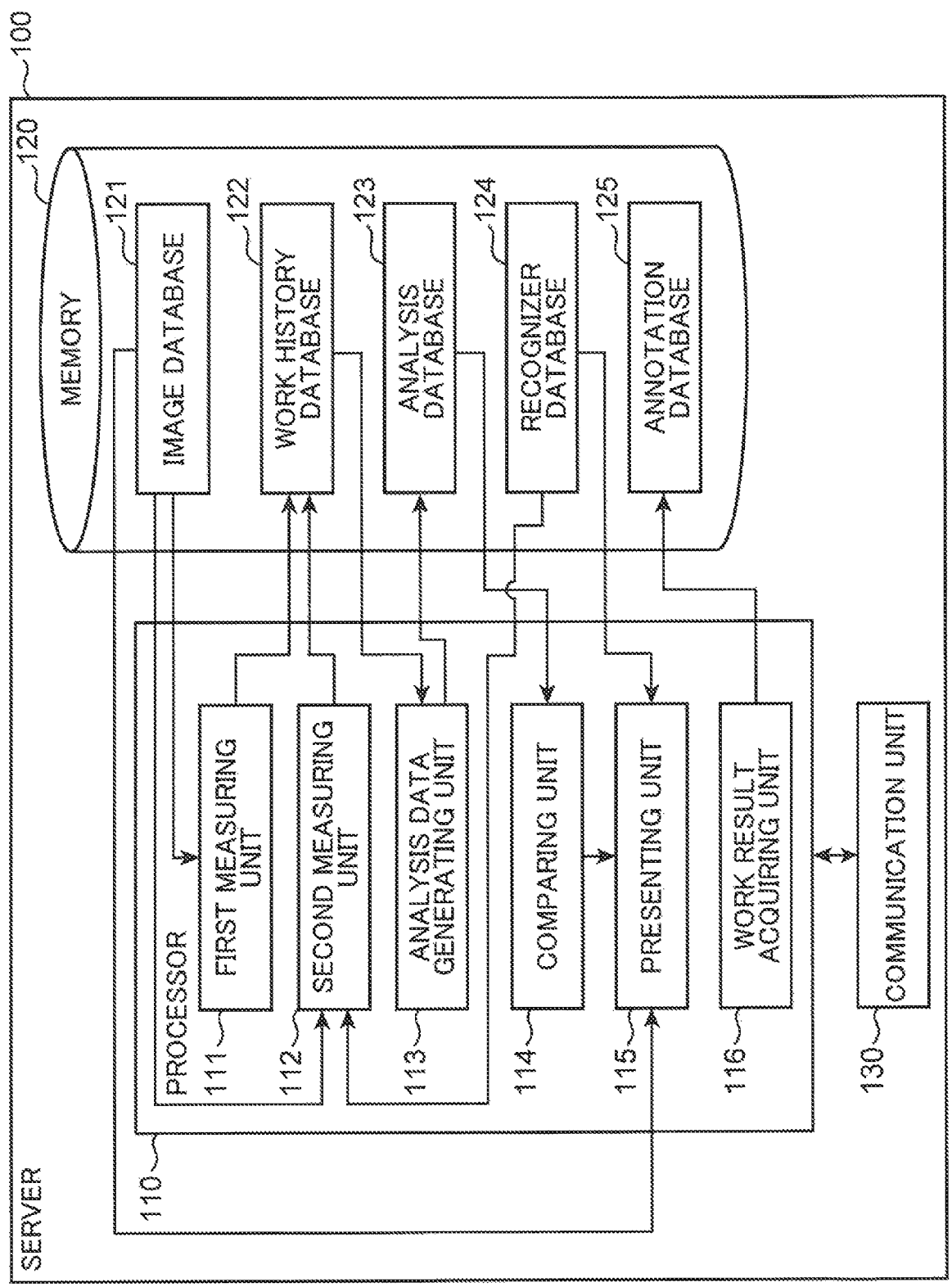
FIG. 2 is a block diagram illustrating an example of a configuration of a server.

FIG. 2 is a block diagram illustrating an example of a configuration of the server 100. The server 100 includes a processor 110, a memory 120, and a communication unit 130. The processor 110 is, for example, an electric circuit such as a CPU.

The processor 110 includes a first measuring unit 111, a second measuring unit 112, an analysis data generating unit 113, a comparing unit 114, a presenting unit 115, and a work result acquiring unit 116.

The first measuring unit 111 measures a first working period which is a working period when the worker is caused to perform first work of setting annotation data to first image data. The first measuring unit 111 only needs to acquire the first image data, for example, by reading out an arbitrary one piece of image data from the image database 121.

The first measuring unit 111, for example, measures a period from when one piece of the first image data is displayed until when annotation data is set at the worker terminal 200 as the first working period, generates work history from the measurement result, and stores the work history in the work history database 122. When the worker terminal 200 detects that one piece of the first image data is displayed on the display unit 202, the worker terminal 200 transmits a detection signal to the server 100. Further, when annotation data is set to one piece of the first image data, the worker terminal 200 transmits the annotation data to the server 100. Therefore, the first measuring unit 111 only needs to measure the first working period for each one piece of the first image data, for example, by measuring a period from when the communication unit 130 receives a detection signal for the first image data until when the communication unit 130 receives the annotation data. Then, the first measuring unit 111 only needs to generate work history while associating the measured first working period with a work type, an identifier of the first image data, work date and time, an identifier of the worker who has performed annotation work, and an identifier of a recognizer (hereinafter, described as a target recognizer) to be used for annotation work, and store the work history in the work history database 122. The work type is information for distinguishing between the first work and second work which will be described later.

The first measuring unit 111 inputs the first image data to the communication unit 130 to transmit the first image data to the worker terminal 200 which is to perform work.

The second measuring unit 112 measures a second working period when the worker is caused to perform second work of correcting advance annotation data for the advance annotation data set based on a recognition result obtained by causing a recognizer to recognize the first image data, generates work history from the measurement result, and stores the work history in the work history database 122.

The second measuring unit 112 may, for example, set advance annotation data to image data which is the same as the image data acquired as the first image data by the first measuring unit 111 from the image database 121. Alternatively, the second measuring unit 112 may, for example, set advance annotation data to image data which is different from the image data acquired as the first image data by the first measuring unit 111 from the image database 121, as the first image data.

As a method to be used by the second measuring unit 112 to measure the second working period, for example, a method which is the same as the method to be used by the first measuring unit 111 to measure the first working period described above is used. The second measuring unit 112 only needs to generate work history while associating the measured second working period with a work type, an identifier of the first image data, work date and time, an identifier of the worker, and an identifier of the target recognizer, and store the work history in the work history database 122. The second measuring unit 112 only needs to generate first image data using the target recognizer among the recognizers stored in the recognizer database 124.

The second measuring unit 112 inputs the first image data, and advance annotation data for the first image data to the communication unit 130 to transmit the first image data and the advance annotation data for the first image data to the worker terminal 200 which is to perform work.

The second measuring unit 112 inputs the first image data acquired from the image database 121 to the recognizer to acquire a recognition result. Then, the second measuring unit 112 inputs the acquired recognition result to the annotation setter. The annotation setter generates advance annotation data based on the input recognition result and passes the advance annotation data to the second measuring unit 112. The second measuring unit 112 generates the advance annotation data for the first image data in this manner. The advance annotation data includes label information indicating a class label set at the recognition target, region information indicating a region including the recognition target, an identifier of the target recognizer, or the like. Note that the recognizer and the annotation setter may be provided at the second measuring unit 112, or may be provided at other components within the processor 110, or may be provided at an external server. The region information is coordinate data of a frame indicating a region including the recognition target. In a case where the frame is a quadrangle circumscribed around the recognition target, the region information is, for example, coordinate data of an upper left vertex, coordinate data of a lower right vertex, or the like, of the frame.

Hereinafter, the first image data to which advance annotation data is not set will be referred to as image data X1, and the first image data to which advance annotation data is set will be referred to as image data X2.

The analysis data generating unit 113 generates analysis data based on the first working period and the second working period stored in the work history database 122. For example, the analysis data generating unit 113 calculates a representative value of the first working period and a representative value of the second working period from the work history stored in the work history database 122. Then, the analysis data generating unit 113 generates analysis data including the representative value of the first working period and the representative value of the second working period. The analysis data generating unit 113 stores the generated analysis data in the analysis database 123 in association with the identifier of the target recognizer. The representative value is, for example, a mean value, a median value, or the like.

The comparing unit 114 compares speed of the first work with speed of the second work for the target recognizer. The comparing unit 114, for example, acquires analysis data corresponding to the target recognizer from the analysis database 123. Then, in a case where the representative value of the first working period included in the analysis data is shorter than the representative value of the second working period, the comparing unit 114 determines that the first work is faster than the second work. Meanwhile, in a case where the representative value of the second working period included in the acquired analysis data is shorter than the representative value of the first working period, the comparing unit 114 determines that the second work is faster than the first work.

In a case where it is determined by the comparing unit 114 that the first work is faster than the second work, the presenting unit 115 requests the worker to set annotation data to the second image data in which advance annotation data is not set. Meanwhile, in a case where it is determined by the comparing unit 114 that the second work is faster than the first work, the presenting unit 115 requests the worker to correct advance annotation data set based on the recognition result obtained by causing the recognizer to recognize the second image data. Hereinafter, the second image data in which advance annotation data is not set will be referred to as image data X3, and the second image data in which advance annotation data is set will be referred to as image data X4.

The presenting unit 115 may acquire image data which is different from the image data X1 used by the first measuring unit 111 to perform measurement and the image data X2 used by the second measuring unit 112 to perform measurement, from the image database 121 as the image data X3. Further, the presenting unit 115 may set image data, in which advance annotation data has been set to image data which is the same as the image data X3, as the image data X4. Alternatively, the presenting unit 115 may set image data, in which advance annotation data has been set to image data which is different from the image data X3, as the image data X4.

The presenting unit 115 inputs the image data X3, the image data X4, and the advance annotation data for the image data X4 to the communication unit 130 to transmit the image data X3, the image data X4 and the advance annotation data for the image data X4 to the worker terminal 200 which is to perform work.

The work result acquiring unit 116 acquires the annotation data set to the image data X3 and X4 by the worker operating the worker terminal 200, via the communication unit 130, and stores the annotation data in the annotation database 125. The annotation data stored in the annotation database 125 includes identifiers of the image data X3 and X4 in which the annotation data has been set, region information for the recognition target, label information indicating a class label set for the recognition target, or the like.

The memory 120 is, for example, a non-volatile storage device such as a hard disk drive and a solid-state drive. The memory 120 includes an image database 121, a work history database 122, an analysis database 123, a recognizer database 124, and an annotation database 125.

The image database 121 is a database which stores image data to be used for annotation work. The image database 121 stores image data and identifiers of the image data in association with each other.

The work history database 122 is a database which stores the work history generated by the first measuring unit 111 and the work history generated by the second measuring unit 112. As described above, the work history is data with which the first working period or the second working period, the work type, the identifier of the image data X1 or the image data X2, work date and time, the identifier of the worker, the identifier of the target recognizer or the like, am associated.

The analysis database 123 is a database which stores the analysis data generated by the analysis data generating unit 113. The analysis database 123 is a database in which the analysis data is associated with the identifier of the target recognizer.

The recognizer database 124 stores configuration data of the target recognizer. In a case where the target recognizer is constituted with a deep neural network, the configuration data of the target recognizer includes, for example, data indicating a plurality of nodes which constitute an input layer, data indicating a plurality of nodes which constitute a plurality of hidden layers, data indicating a plurality of nodes which constitute an output layer, a weight value of a link connecting respective nodes, or the like.

The annotation database 125 is a database which stores the annotation data acquired by the work result acquiring unit 116.

The communication unit 130 is, for example, a communication path for connecting the server 100 to the network 400. The communication unit 130 transmits the image data X1 to X4 input from the processor 110 to the worker terminal 200 which is to perform work. The communication unit 130 receives a detection signal which makes a notification that the image data is displayed on the worker terminal 200, and the annotation data set by the worker, from the worker terminal 200. The communication unit 130 receives the image data on which work is to be performed, from the manager terminal 300 and causes the image data to be stored in the image database 121. The communication unit 130 receives the configuration data of the target recognizer from the manager terminal 300 and causes the configuration data to be stored in the recognizer database 124. The communication unit 130 receives designation information for designating the target recognizer from the manager terminal 300. The communication unit 130 transmits the work history stored in the work history database 122, the analysis data stored in the analysis database 123, and the annotation data stored in the annotation database 353 to the manager terminal 300.

In the present embodiment, the server 100 first executes a measurement phase, and, then, executes a work phase. In the measurement phase, the first working period and the second working period are measured by the worker being caused to actually perform annotation work on the image data X1 and the image data X2.

In the work phase, in a case where it is determined that the first work is faster than the second work based on the measurement result in the measurement phase, the worker is caused to perform annotation work through the first work, while, in a case where it is determined that the second work is faster than the first work based on the measurement result in the measurement phase, the worker is caused to perform annotation work through the second work.

In the measurement phase, for example, by a plurality of workers being caused to perform annotation work on approximately 10 to 100 pieces of image data X1, the first working period is measured for each worker and for each piece of the image data X1. Further, in the measurement phase, for example, by a plurality of workers being caused to perform annotation work on the image data X2 of the same number of pieces of the image data X1, the second working period is measured for each worker and for each piece of the image data X2. Here, in the measurement phase, the same image data X1 and the same image data X2 may be presented, or different image data X1 and different image data X2 may be presented to each of the plurality of workers.

In the work phase, by a plurality of workers being caused to perform annotation work while sharing several hundred thousand to several million pieces of image data stored in the image database 121, the annotation data is acquired. Note that, in the work phase, the annotation work may be performed on the image data including the image data used in the measurement phase, or the annotation work may be performed on the image data other than the image data used in the measurement phase.

Figure 3:
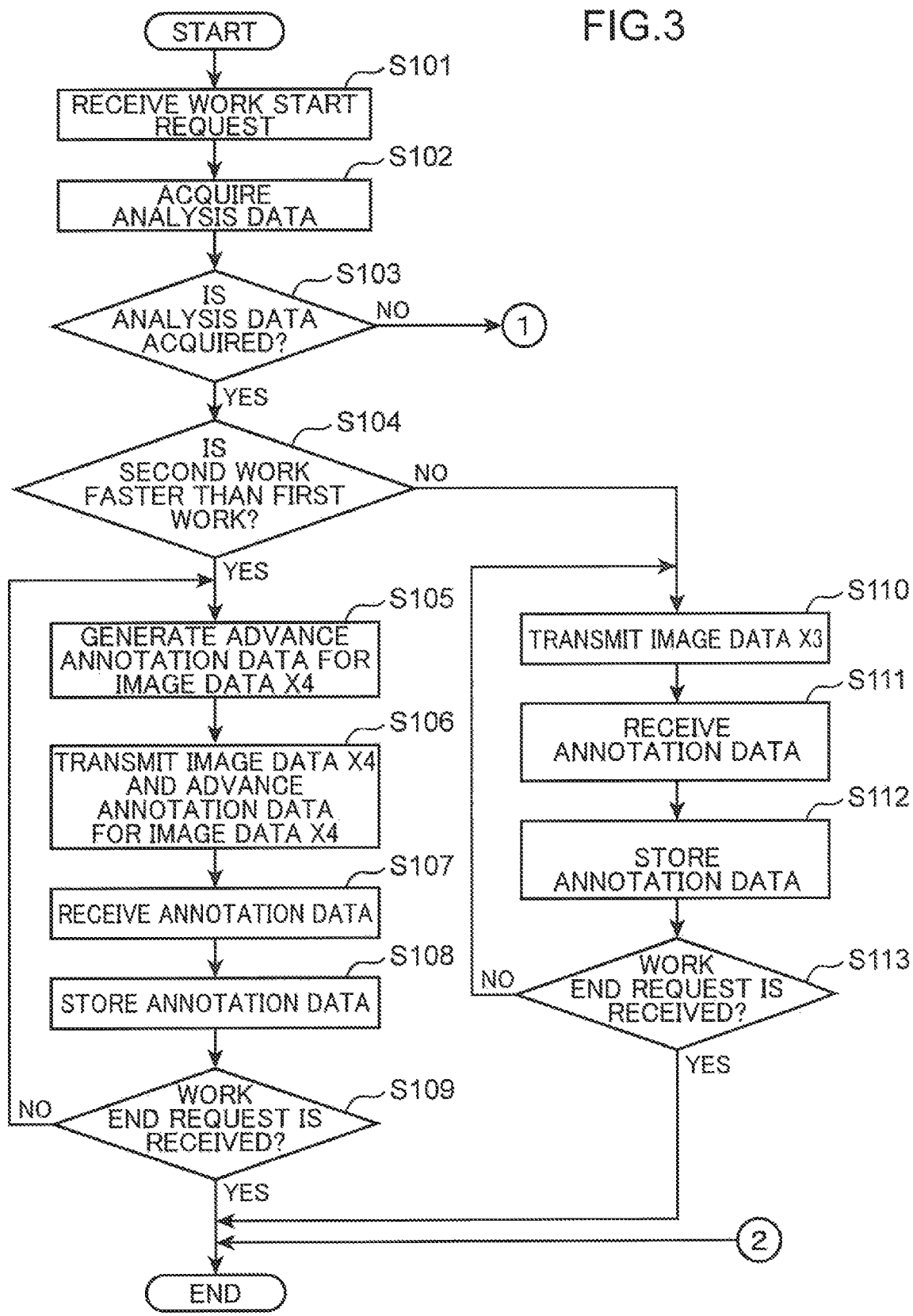
FIG. 3 is a flowchart illustrating an example of processing in a case where a server causes a worker to perform annotation work in the first embodiment.
Figure 4:
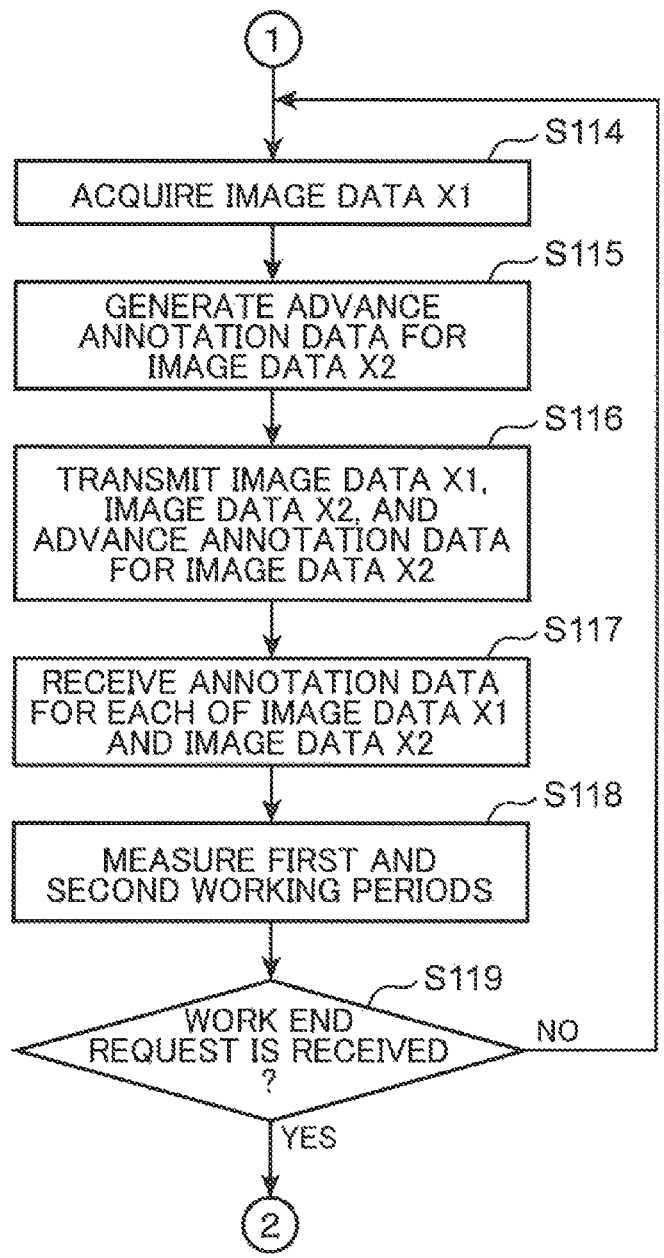
FIG. 4 is a flowchart which is a continuation of FIG. 3.

Processing of the server 100 in the first embodiment will be described in detail below. FIG. 3 is a flowchart illustrating an example of processing in a case where a server 100 causes a worker to perform annotation work in the first embodiment. FIG. 4 is a flowchart which is a continuation of FIG. 3.

In step S101, the communication unit 130 receives a work start request from a certain worker terminal 200. The work start request is data indicating the worker's intention of starting the annotation work. The work start request is transmitted from the worker terminal 200 to the server 100 in a case where the worker inputs operation of starting the annotation work to the worker terminal 200. Hereinafter, the worker terminal 200 which has transmitted the work start request will be described as the first worker terminal.

In step S102, the comparing unit 114 acquires the analysis data corresponding to the target recognizer in the analysis database 123.

In step S103, in a case where the analysis data of the target recognizer is stored in the analysis database 123, and the comparing unit 114 can acquire the analysis data (step S103: YES), the processing proceeds to step S104. Meanwhile, in a case where the analysis data of the target recognizer is not stored in the analysis database 123, and the comparing unit 114 cannot acquire the analysis data (step S103: NO), the processing proceeds to step S114.

In a case where the analysis data for the target recognizer is stored in the analysis database 123, it means that the measurement phase has been finished for the target recognizer. Therefore, in flow in FIG. 3, the processing after the determination result in S103 is YES becomes processing of the work phase, and the processing after the determination result in S103 is NO becomes processing of the measurement phase.

In step S104, the comparing unit 114 compares speed of the first work with speed of the second work with reference to the analysis data. FIG. 6 is a view illustrating an example of a data configuration of the analysis data in the first embodiment. As illustrated in FIG. 6, the analysis data includes the first working period and the second working period. The first working period and the second working period indicate the representative value of the first working period and the representative value of the second working period measured in the measurement phase. Further, the identifier of the target recognizer is associated with the analysis data.

In a case where the first working period included in the analysis data is shorter than the second working period, the comparing unit 114 determines that the first work is faster than the second work (step S104: NO), and the processing proceeds to step S110. Meanwhile, in a case where the second working period included in the analysis data is shorter than the first working period, the comparing unit 114 determines that the second work is faster than the first work (step S104: YES), and the processing proceeds to step S105.

In step S105, the presenting unit 115 acquires one piece of image data on which work is to be performed from the image database 121 as the image data X4, and generates advance annotation data for the image data X4 by causing the target recognizer to execute image recognition on the image data X4, and inputting the recognition result to the annotation setter.

In step S106, the presenting unit 115 transmits the image data X4 and the advance annotation data for the image data X4 to the first worker terminal via the communication unit 130. With this, the first worker terminal displays the image data X4 on which the region and the class label are superimposed based on the advance annotation data, on the display unit 202. The worker performs the second work of correcting the advance annotation data for the image data X4. If the second work for the image data X4 is finished, the first worker terminal transmits the annotation data corrected through the second work to the server 100.

In step S107, the communication unit 130 receives the corrected annotation data.

In step S108, the work result acquiring unit 116 stores the annotation data received in step S107 in the annotation database 125.

In step S109, the work result acquiring unit 116 determines whether or not the communication unit 130 has received a work end request from the first worker terminal. In a case where it is determined that the communication unit 130 has received the work end request (step S109: YES), the work result acquiring unit 116 finishes the processing. Meanwhile, in a case where it is determined that the communication unit 130 has not received a work end request (step S109: NO), the work result acquiring unit 116 returns the processing to step S105. With this, the processing in step S105 and subsequent steps is executed, and the next image data X4 is transmitted to the first worker terminal. The work end request is data indicating intention of finishing the annotation work by the worker of the first worker terminal.

As described above, during a period from when the work start request is transmitted until when the work end request is transmitted, the image data X4 and the advance annotation data for the image data X4 are sequentially transmitted to the first worker terminal, and the worker performs the second work on the image data X4 which is sequentially transmitted.

In step S110, the presenting unit 115 acquires one piece of image data on which work is to be performed from the image database 121 as the image data X3, and transmits the image data X3 to the first worker terminal via the communication unit 130. The image data X3 is image data in which advance annotation data is not set. With this, the first worker terminal displays the image data X3 on the display unit 202. The worker performs the first work of setting annotation data to the image data X3 in which advance annotation data is not set, from the beginning. If the first work for the image data X3 is finished, the first worker terminal transmits the annotation data set through the first work to the server 100.

In step S111, the communication unit 130 receives the annotation data. Processing in step S112 is the same as the processing in step S108. In step S113, in a case where it is determined that the communication unit 130 has not received a work end request (step S113: NO), the work result acquiring unit 116 returns the processing to step S110. Meanwhile, in a case where it is determined that the communication unit 130 has received a work end request (step S113: YES), the work result acquiring unit 116 finishes the processing.

As described above, during a period from when the work start request is transmitted until when the work end request is transmitted, the image data X3 is sequentially transmitted to the first worker terminal, and the worker performs the first work on the image data X3 which is sequentially transmitted.

In step S114, the first measuring unit 111 acquires one piece of image data from the image database 121 as the image data X1.

In step S115, the second measuring unit 112 acquires one piece of image data from the image database 121 as the image data X2, and generates advance annotation data for the image data X2 by causing the target recognizer to execute image recognition on the image data X2 and inputting the recognition result to the annotation setter.

In step S116, the communication unit 130 transmits the image data X1, the image data X2, and advance annotation data for the image data X2 to the first worker terminal. With this, the first worker terminal sequentially displays the image data X1 and the image data X2 on the display unit 202. Note that, when the image data X1 and the image data X2 are displayed, the first worker terminal transmits a detection signal which makes a notification of a display timing, to the server 100. The worker performs the first work of setting annotation data to the image data X1 in which advance annotation data is not set, from the beginning. Further, the worker performs the second work of correcting advance annotation data to the image data X2 in which advance annotation data is set. When the first work for the image data X is finished, the first worker terminal transmits the annotation data set through the first work, to the server 100. If the second work for the image data X2 is finished, the first worker terminal transmits the annotation data corrected through the second work to the server 100.

In step S117, the work result acquiring unit 116 receives the annotation data for each of the image data X1 and the image data X2 from the first worker terminal, and stores the annotation data in the annotation database 125.

In S118, the first measuring unit 111 generates work history by measuring the first working period, and stores the work history in the work history database 122, and the second measuring unit 112 generates work history by measuring the second working period, and stores the work history in the work history database 122. In this case, the first measuring unit 111 only needs to measure a period from when a detection signal, which makes a notification that the image data X is displayed on the first worker terminal, is received until when the annotation data is received, as the first working period. The second measuring unit 112 also only needs to measure the second working period in a similar manner to the first measuring unit 111.

In step S119, the work result acquiring unit 116 determines whether or not the communication unit 130 has received a work end request from the first worker terminal. In a case where it is determined that the communication unit 130 has received a work end request (step S119: YES), the work result acquiring unit 116 finishes the processing.

Meanwhile, in a case where it is determined that the communication unit 130 has not received a work end request (step S119: NO), the work result acquiring unit 116 returns the processing to step S114. With this, the processing in step S114 and subsequent steps is executed, and the next image data X1, the image data X2, and the advance annotation data for the image data X2 are transmitted to the first worker terminal.

As described above, in the measurement phase, the image data X1, the image data X2, the advance annotation data for the image data X2 are sequentially transmitted to the first worker terminal, the first working period and the second working period are sequentially measured, and work history including the measurement results is stored in the work history database 122.

Note that, while, in step S116 in FIG. 4, the image data X1, and the image data X2 and the advance annotation data for the image data X2 are transmitted at the same time, the present disclosure is not limited to this, and the server 100 may transmit the image data X2 and the advance annotation data for the image data X2 after receiving the annotation data for the image data X1.

Figure 5:
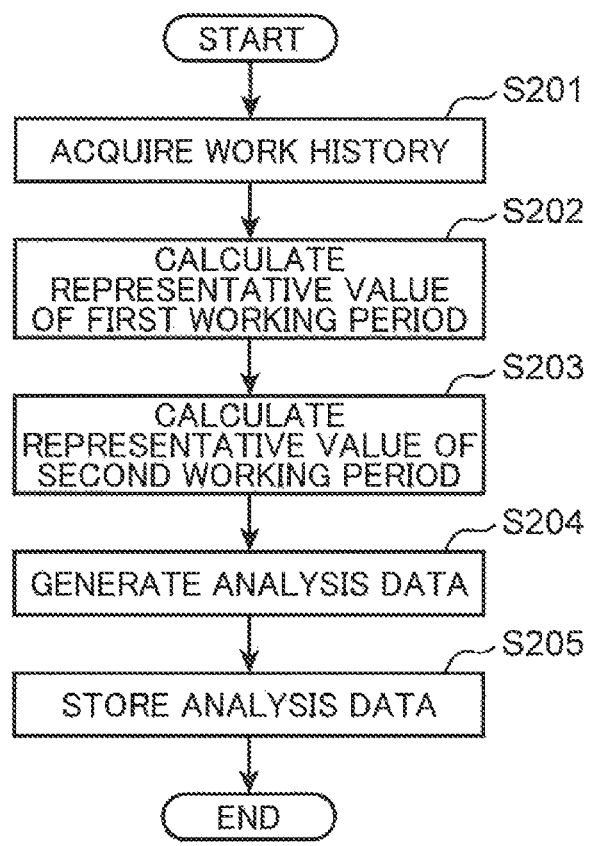
FIG. 5 is a view illustrating an example of processing in which the server generates analysis data in the first embodiment.

Generation of the analysis data will be described next. FIG. 5 is a view illustrating an example of processing of the server 100 generating the analysis data in the first embodiment. The server 100 executes flow illustrated in FIG. 5 in a case where the first working period and the second working period stored in the work history database 122 reach given periods for the target recognizer.

In step S201, the analysis data generating unit 113 acquires work history corresponding to the target recognizer from the work history database 122.

In step S202, the analysis data generating unit 113 calculates the representative value of the first working period from the first working period stored in the work history acquired in step S201. In step S203, the analysis data generating unit 113 calculates the representative value of the second working period from the second working period stored in the work history acquired in step S201.

In step S204, the analysis data generating unit 113 generates the analysis data by associating the representative value of the first working period and the representative value of the second working period calculated in step S202, and the identifier of the target recognizer.

In step S205, the analysis data generating unit 113 stores the analysis data generated in step S205 in the analysis database 123. With this, the analysis data as illustrated in FIG. 6 is stored in the analysis database 123.

Figure 7:
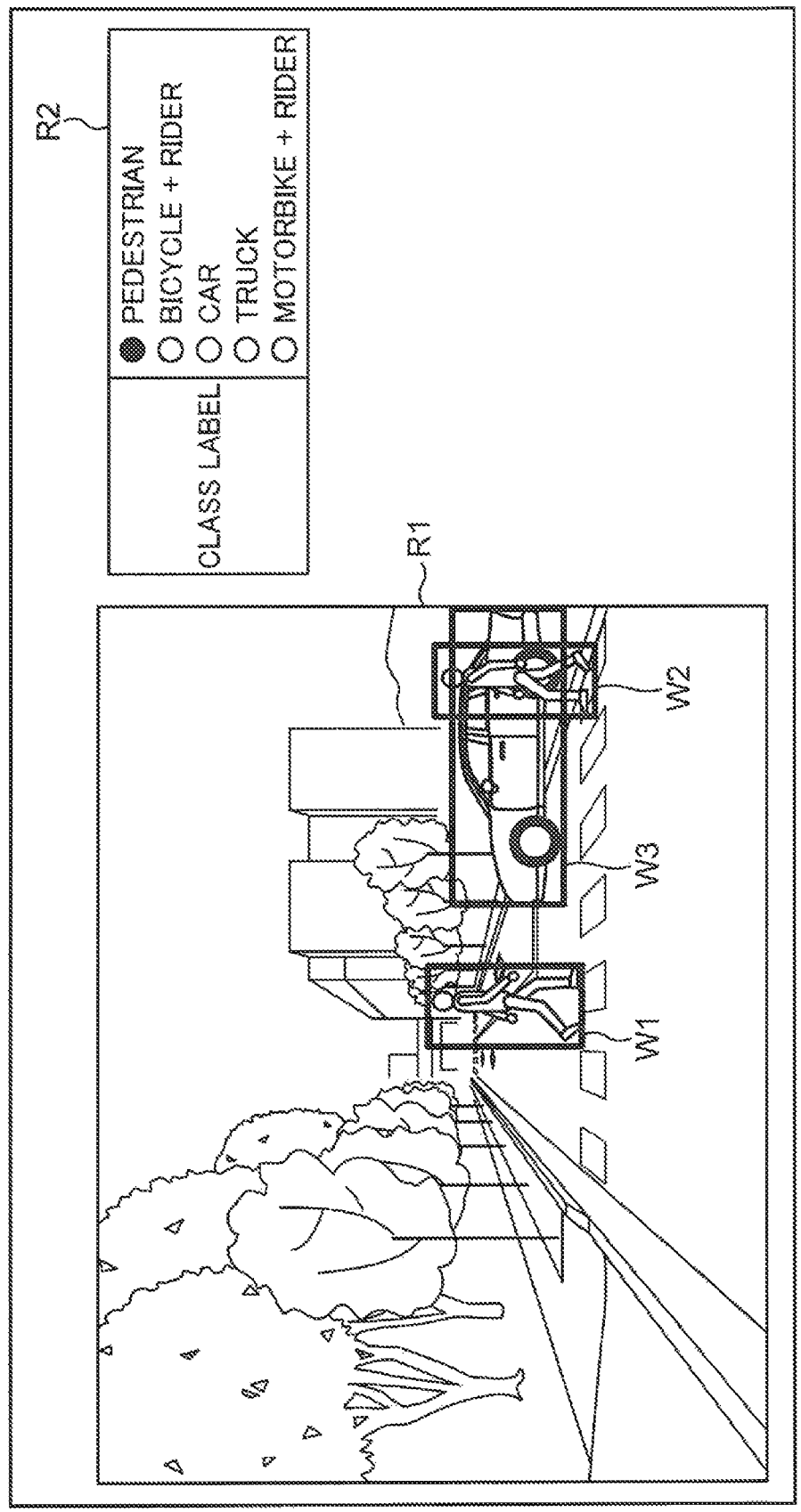
FIG. 7 is a view illustrating an example of a work screen to be displayed on a worker terminal in a case where annotation work is performed.

A specific example of the annotation work will be described next. FIG. 7 is a view illustrating an example of a work screen to be displayed on the worker terminal 200 in a case where the annotation work is performed. The work screen includes an image field R1 of the image data on which work is to be performed, and a class label input field R2. The class label input field R2 is a field in which a class label of the recognition target is to be input. The worker operates the operating unit 201 to set a frame circumscribed around the recognition target in the image field R1. Here, a frame W1 is set for a pedestrian who walks on a pedestrian crossing from a left side to a right side. Further, a frame W2 is set for a pedestrian who walks on the pedestrian crossing from a right side to a left side. Still further, a frame W3 is set for a car which drives on a road.

Figure 8:
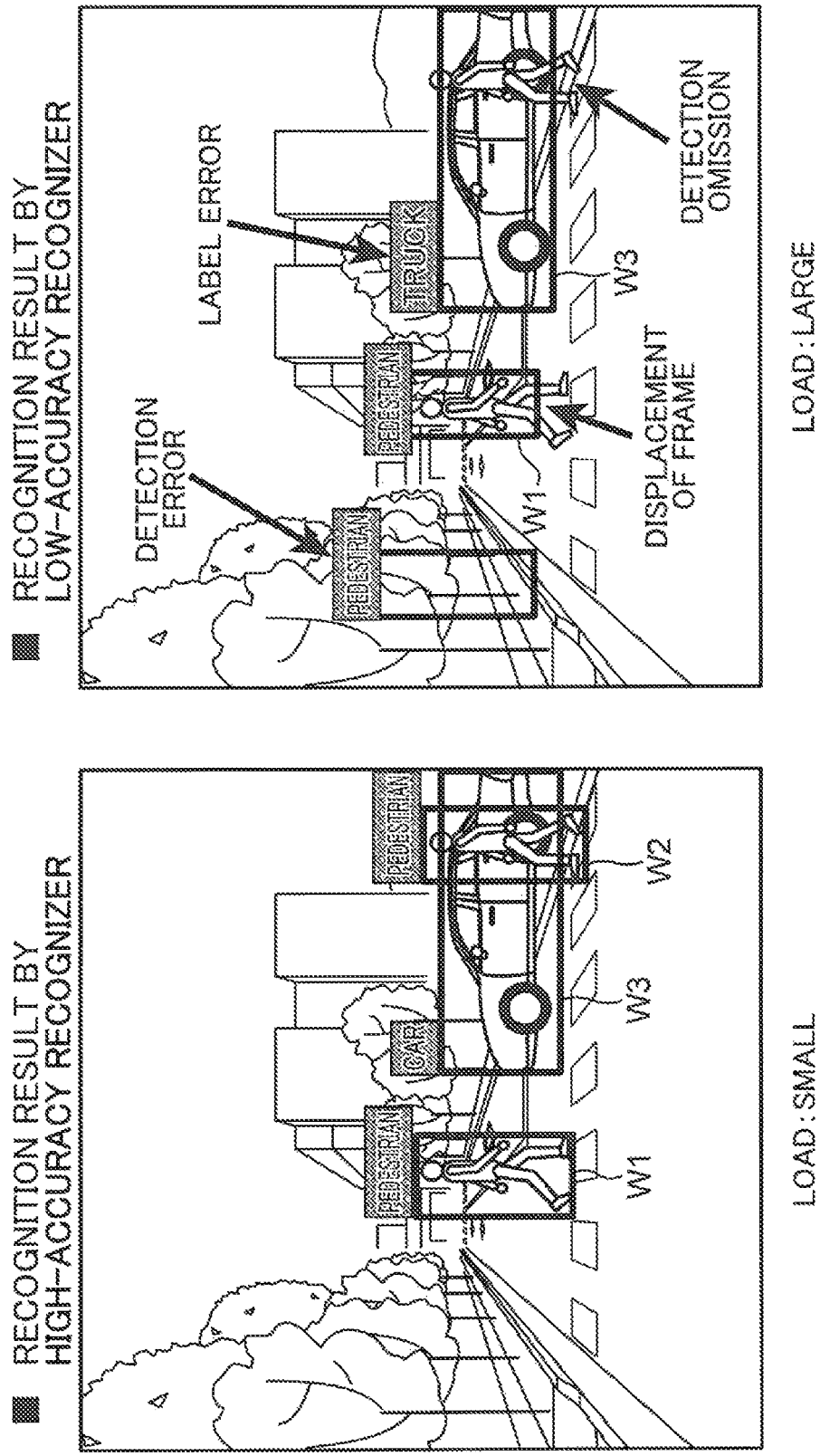
FIG. 8 is a view illustrating a setting result of advance annotation data.

Here, as a class of the recognition target, "pedestrian", "bicycle+rider", "car", "truck", and "motorbike+rider" are set in advance. Therefore, GUI components for selecting these are displayed in the class label input field R2. For example, in a case where the worker sets the frame W1 for the pedestrian, the worker operates the operating unit 201 to select the pedestrian from the class label input field R2. Then, as illustrated in FIG. 8, a class label described as a pedestrian is displayed at an upper part of the frame W1 of the pedestrian. The worker sets annotation data to the image data by repeating such work.

FIG. 8 is a view illustrating a setting result of advance annotation data. In FIG. 8, a left part indicates a setting result of advance annotation data set based on a recognition result by a high-accuracy recognizer, while, a right part indicates a setting result of advance annotation data set based on a recognition result by a low-accuracy recognizer.

As illustrated in the left part in FIG. 8, in a case where accuracy of the recognizer is high, the frame W1 which accurately encloses the pedestrian is set. Further, it can be understood that class labels are accurately provided such that a class label of a pedestrian is set for the pedestrian, and a class label of a car is set for the car. In this case, in a case where the worker performs the second work on this image data, load of the worker becomes smaller.

Meanwhile, as illustrated in the right part in FIG. 8, in a case where accuracy of the recognizer is low, a detection error which is a state where a tree is recognized as a pedestrian, displacement of a frame which is a state where the frame W does not accurately enclose the whole of the pedestrian, a label error which is a state where a class label of a truck is provided to a car, a detection omission which is a state where a pedestrian on the extreme right is not detected, or the like, occur. In this case, in a case where the worker performs the second work on this image data, load of the worker becomes greater. Then it is unknown as to whether or not accuracy of the recognizer is high until the recognizer is caused to actually recognize image data.

Therefore, in the present embodiment, a working period for image data to which advance annotation data is set, and a working period for image data to which advance annotation data is not set are respectively actually measured. Then, in the work phase, it is determined from the measurement results which of the first work and the second work is faster, and the worker is imposed to perform the work which is determined as faster.

Figure 9:
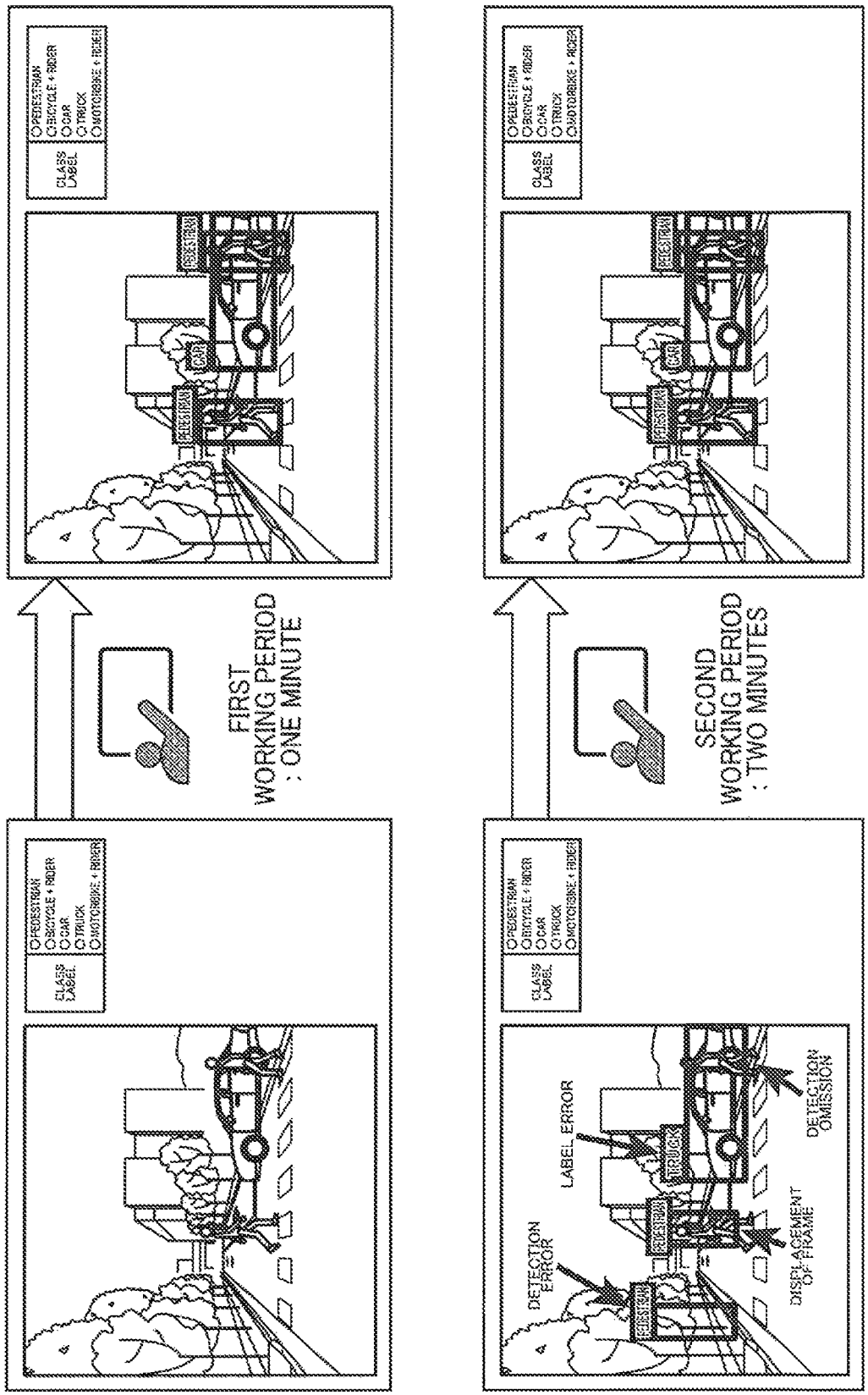
FIG. 9 is a view illustrating an example of measurement results of a first working period and a second working period.

FIG. 9 is a view illustrating an example of measurement results of a first working period and a second working period. In FIG. 9, an upper part indicates a measurement result of the first working period, and a lower part indicates a measurement result of the second working period.

An upper left part of FIG. 9 illustrates the image data X1 which is image data in which advance annotation data is not set. An upper right part of FIG. 9 illustrates a work result in a case where the worker performs the first work on the upper left part in FIG. 9. In the example in the upper part of FIG. 9, one minute is measured as the first working period.

A lower left part of FIG. 9 illustrates the image data X2 which is image data in which advance annotation data is set. A lower right part of FIG. 9 illustrates a work result in a case where the worker performs the second work on the lower left part in FIG. 9. In the example in the lower part of FIG. 9, two minutes are measured as the second working period.

Therefore, in a case of FIG. 9, since the first working period is shorter than the second working period, it can be understood that work cost is lower in a case where the first work is performed than in a case where the second work is performed. Therefore, in the present embodiment, in a case where the measurement results for the target recognizer overall indicate tendency as illustrated in FIG. 9, in the work phase, the worker is imposed to perform the first work.

Figure 10:
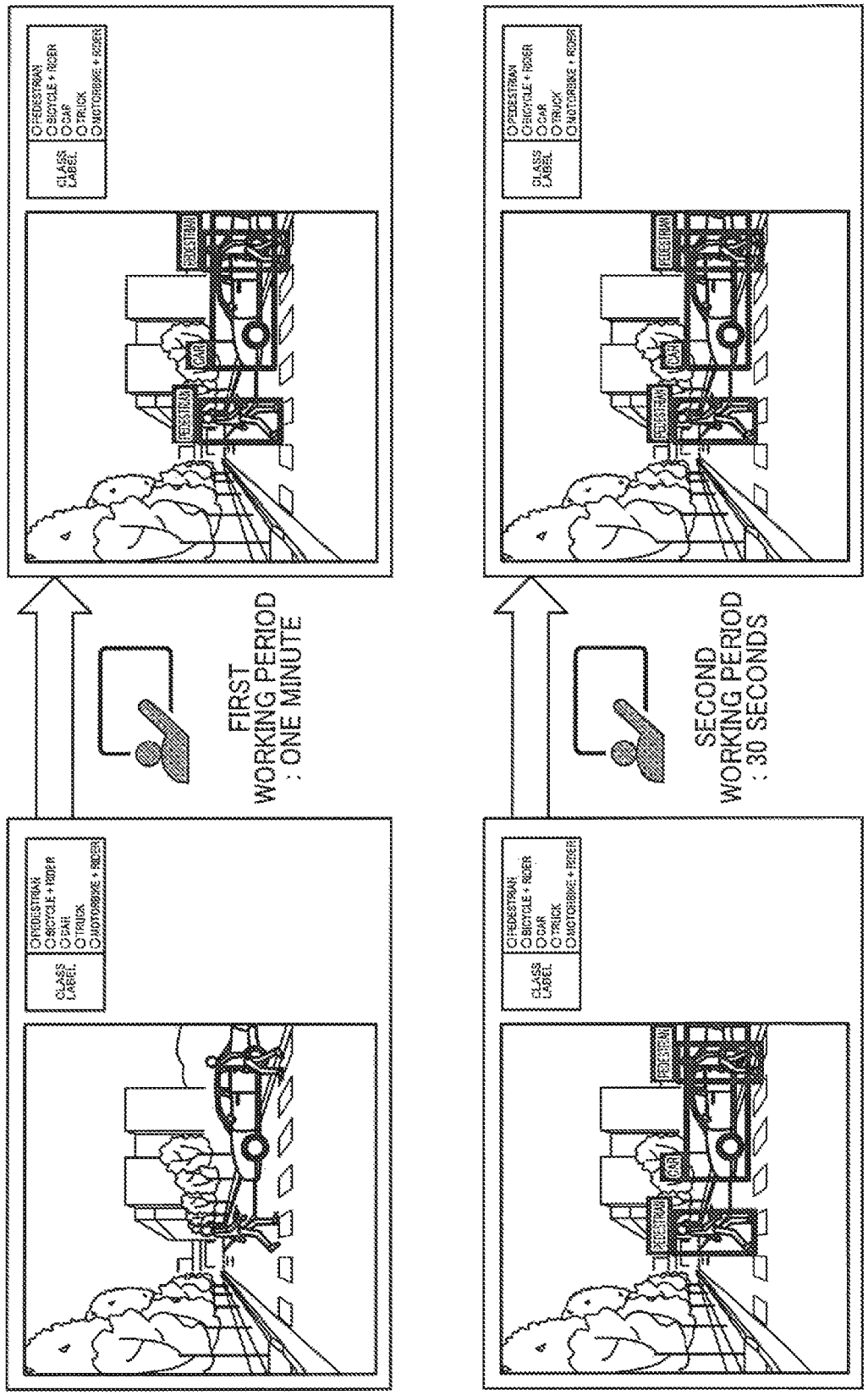
FIG. 10 is a view illustrating an example of measurement results of a first working period and a second working period.

FIG. 10 is a view illustrating an example of measurement results of a first working period and a second working period. In FIG. 10, an upper part indicates a measurement result of the first working period, and a lower part indicates a measurement result of the second working period.

An upper left part of FIG. 10 illustrates the image data X1 in which advance annotation data is not set. An upper right part of FIG. 10 illustrates a work result in a case where the worker performs the first work on the upper left part in FIG. 10. In the example in the upper part of FIG. 10, one minute is measured as the first working period.

A lower left part of FIG. 10 illustrates the image data X2 which is image data in which advance annotation data is set. A lower right part of FIG. 10 illustrates a work result in a case where the worker performs the second work on the lower left part in FIG. 10. In the example in the lower part of FIG. 10, 30 seconds are measured as the second working period.

Therefore, in a case of FIG. 10, since the second working period is shorter than the first working period, work cost becomes lower in a case where the second work is performed than in a case where the first work is performed. Therefore, in the present embodiment, in a case where the measurement results for the target recognizer overall indicate tendency as illustrated in FIG. 10, in the work phase, the worker is imposed to perform the second work.

In this manner, in the present embodiment, in a case where work of setting annotation data is faster in a case where the worker performs work of setting annotation data from the beginning for a specific recognizer, the worker performs annotation work on the image data in which advance annotation data is not set. Meanwhile, in a case where annotation work is faster in a case where the worker performs work of correcting advance annotation data on image data in which the advance annotation data is set, the worker performs annotation work on the image data in which the advance annotation data is set. As a result, according to this aspect, it is possible to reduce a working period and work cost such as personnel cost to be spent for annotation work.

Second Embodiment

A second embodiment is an embodiment in which an optimal value of a first threshold with respect to reliability to be used for determination as to whether or not the target recognizer sets advance annotation data to image data is determined. Note that, in the present embodiment, the same reference numerals will be assigned to components which am the same as the components in the first embodiment, and description will be omitted. Further, in the second embodiment, since an overall configuration of an annotation system is the same as that in FIG. 1, and a configuration of the server 100 is the same as that in FIG. 2, description will be provided using FIG. 1 and FIG. 2. This will similarly apply to embodiments which will be described later.

Advance annotation data is set to a recognition target in a case where a value of reliability of a recognition result output by the recognizer along with the recognition result is equal to or greater than the first threshold.

FIG. 2 will be referred to. In the present embodiment, the second measuring unit 112 sets a plurality of first thresholds, measures the second working period for each of the plurality of first thresholds, generates work history based on the measurement results, and stores the work history in the work history database 122.

In the present embodiment, the analysis data generating unit 113 acquires the second working period measured for each of the plurality of first thresholds from the work history database 122, calculates the representative value of the second working period for each of the plurality of first thresholds to generate analysis data, and stores the analysis data in the analysis database 123. Then, the analysis data generating unit 113 determines a first threshold with which the second working period is the shortest in the generated analysis data, as an optimal value of the first threshold.

In the present embodiment, the comparing unit 114 acquires the analysis data from the analysis database 123, and compares the first working period with the second working period corresponding to the optimal value of the first threshold, included in the analysis data, to compare speed of the first work with speed of the second work.

In the present embodiment, in a case where it is determined that the second work is faster than the first work, the presenting unit 115 generates advance annotation data for the image data X4 by causing the target recognizer to execute image recognition of the image data X4 using the optimal value of the first threshold and inputting the recognition result to the annotation setter. Then, the presenting unit 115 transmits the image data X4, and the advance annotation data for the image data X4 to the worker terminal 200 via the communication unit 130.

Figure 11:
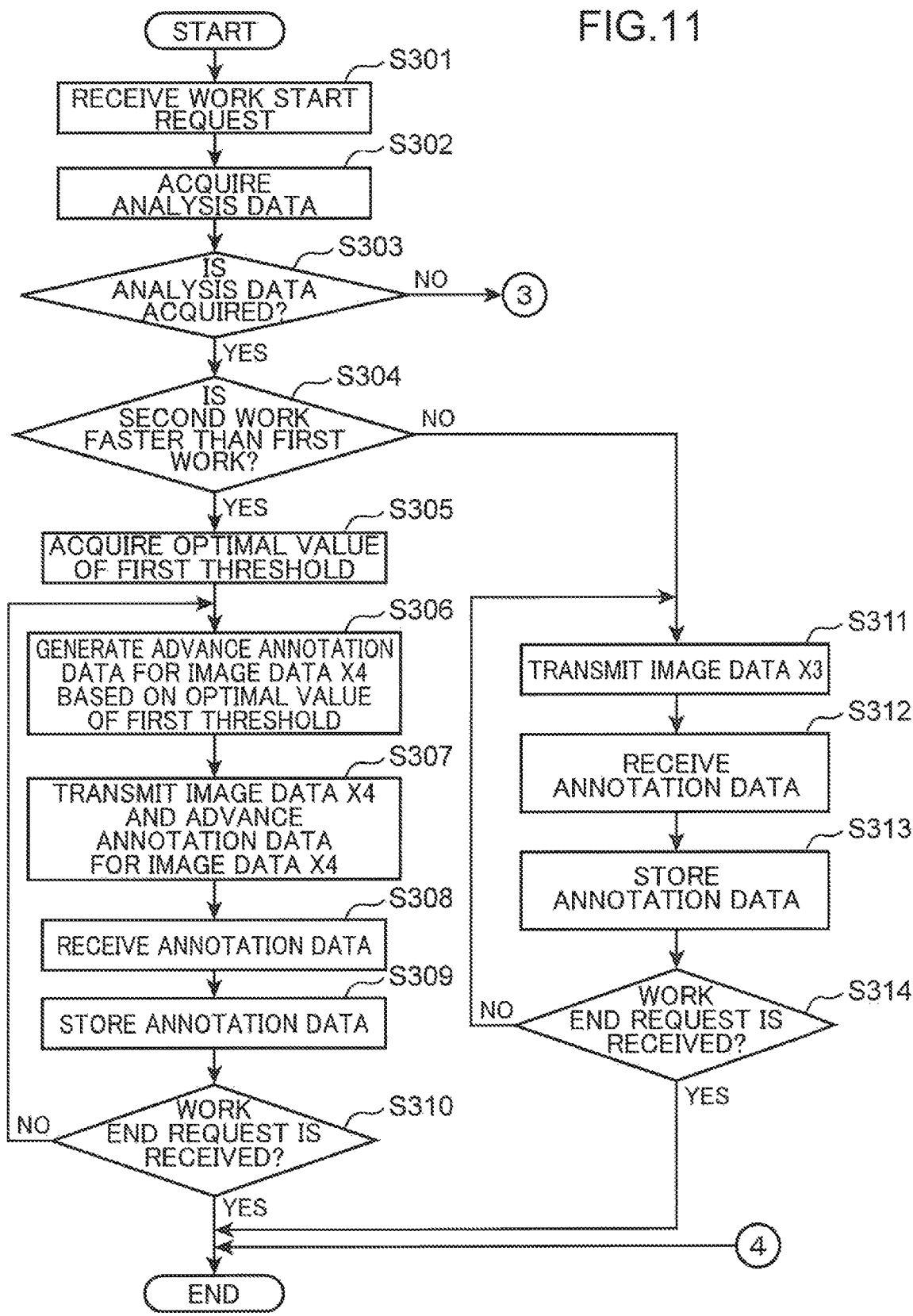
FIG. 11 is a flowchart illustrating an example of processing in a case where a server causes a worker to perform annotation work in a second embodiment.
Figure 12:
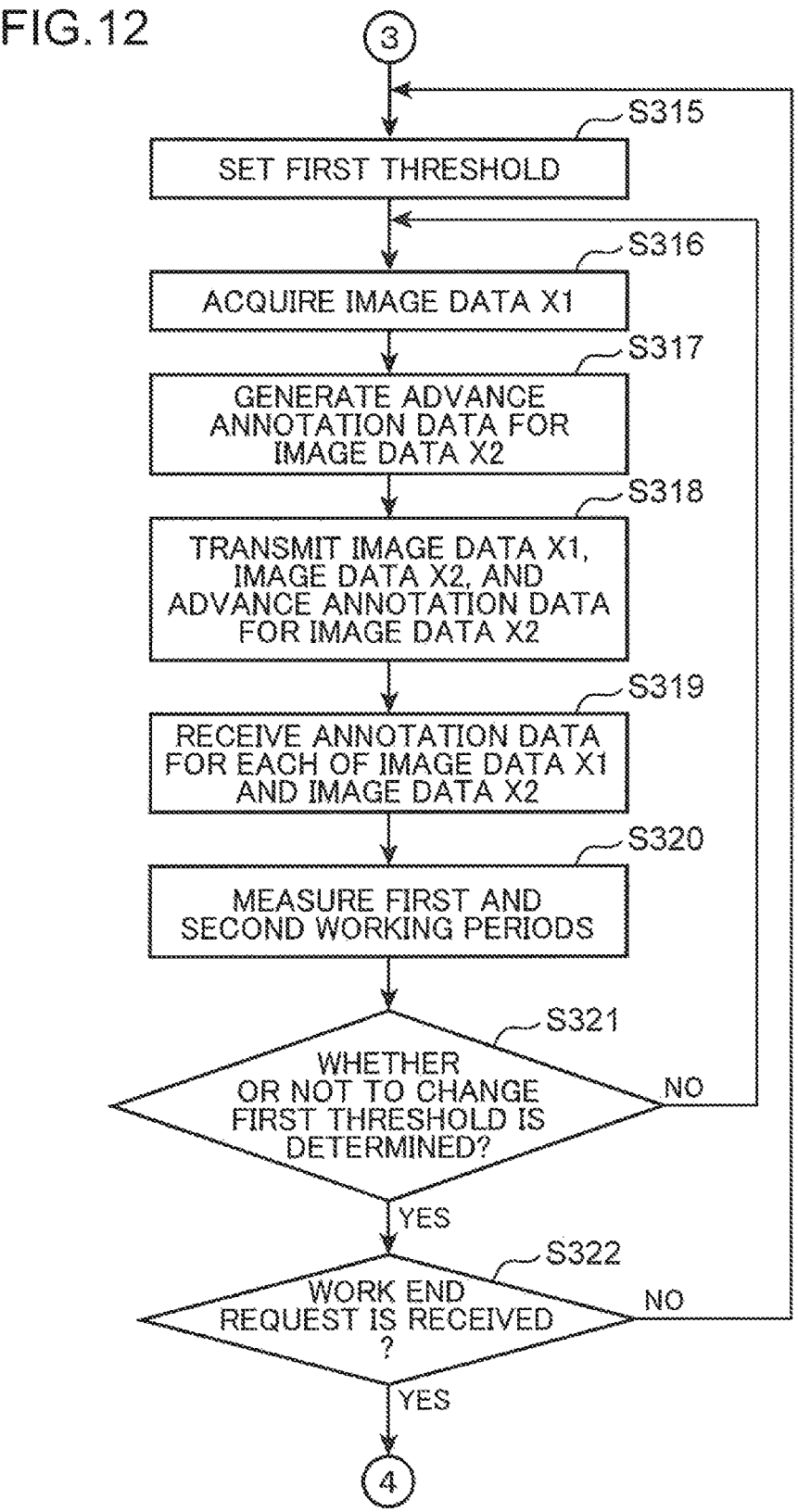
FIG. 12 is a flowchart which is a continuation of FIG. 11.

FIG. 11 is a flowchart illustrating an example of processing in a case where a server 100 causes a worker to perform annotation work in the second embodiment. FIG. 12 is a flowchart which is a continuation of FIG. 11.

Processing in step S301 and S302 is the same as the processing in step S101 and S102 in FIG. 3. However, in step S302, the analysis data illustrated in FIG. 14 is acquired. FIG. 14 is a view illustrating an example of the analysis data in the second embodiment.

The analysis data illustrated in FIG. 14 includes a first working period and a second working period for each of a plurality of first thresholds. In the measurement phase of the present embodiment, a plurality of second working periods are measured for each of the plurality of first thresholds while the first threshold is changed. Then, the analysis data is generated by the representative value of the second working period being calculated for each of the plurality of first thresholds from the measurement results. Therefore, in the analysis data illustrated in FIG. 14, the second working period indicates the representative value of the second working period for each of the plurality of first thresholds. Here, the analysis data includes second working periods for respective n (where n is an integer equal to or greater than 2) first thresholds TH1 of the first thresholds TH1_1, TH1_2, . . . , TH1_n.

Further, in the measurement phase, the first threshold corresponding to the representative value of the shortest second working period among the representative values of the second working periods calculated for each of the first thresholds is determined as the optimal value of the first threshold. In the example in FIG. 14, the first threshold TH1_2 indicated with an arrow is determined as the optimal value of the first threshold.

Meanwhile, the target recognizer is not used in measurement of the first working period. Therefore, in the analysis data illustrated in FIG. 14, the first working period is not calculated for each of the first thresholds TH1.

Further, in the analysis data illustrated in FIG. 14, the identifier of the target recognizer is associated with each of the first working period and the second working period.

Processing in step S303 is the same as the processing in step S103 in FIG. 3. In step S304, the comparing unit 114 compares speed of the first work with speed of the second work with reference to the analysis data. In the example in FIG. 14, since the first threshold TH1_2 is the optimal value, the second working period measured with the first threshold TH1_2 is compared with the first working period. Then, if the second working period is shorter than the first working period, it is determined that the second work is faster than the first work (step S304: YES), and the processing proceeds to step S305. Meanwhile, if the first working period is shorter than the second working period measured with the first threshold TH12, it is determined that the first work is faster than the second work (step S304: NO), and the processing proceeds to step S311.

In step S305, the comparing unit 114 acquires the optimal value of the first threshold from the analysis data. In the example in FIG. 14, the first threshold TH1_2 is acquired as the optimal value.

In step 306, the presenting unit 115 acquires one piece of image data on which work is to be performed from the image database 121 as the image data X4, and generates advance annotation data for the image data X4 by causing the target recognizer to execute image recognition on the image data X4 using the optimal value of the first threshold, and inputting the recognition result to the annotation setter.

Processing from step S307 to step S310 is the same as the processing from step S106 to step S109 in FIG. 3. Processing from step S311 to step S314 is the same as the processing from step S110 to step S113 in FIG. 3.

In step S315, the second measuring unit 112 sets the first threshold. In this case, the first threshold is sequentially set so as to increase or decrease by a predetermined step width within a numerical value range determined in advance.

Processing in step S316 is the same as the processing in step S114 in FIG. 4. In step S317, the second measuring unit 112 acquires one piece of image data from the image database 121 as the image data X2, and generates advance annotation data for the image data X2 by causing the target recognizer to execute image recognition on the image data X2 using the optimal value of the first threshold set in the step S315 and inputting the recognition result to the annotation setter.

Processing from step S318 to step S320 is the same as the processing from step S116 to step S118.

In step S321, the second measuring unit 112 determines whether or not to change the first threshold. In a case where a predetermined number of measurement results of the first working periods and the second working periods are obtained for the first threshold set in step S315, the second measuring unit 112 determines to change the first threshold (step S321: YES), and the processing proceeds to step S322. Meanwhile, in a case where a predetermined number of measurement results of the first working periods and the second working periods are not obtained, the second measuring unit 112 determines not to change the first threshold (step S321: NO), and the processing returns to step S316. With this, the processing from step S316 to step S321 is repeated until the predetermined number of measurement results of the first working periods and the second working periods are obtained for the one first threshold set in step S315.

In step S322, in a case where it is determined that the communication unit 130 has received a work end request (step S322: YES), the work result acquiring unit 116 finishes the processing. Meanwhile, in a case where it is determined that the communication unit 130 has not received a work end request (step S322: NO), the work result acquiring unit 116 returns the processing to step S315. With this, the next first threshold is set in step S315, and the processing in step S316 and subsequent steps is executed.

As described above, in the measurement phase, the image data X1, the image data X2, the advance annotation data for the image data X2 are sequentially transmitted to the first worker terminal, a predetermined number of the first working period and the second working period are sequentially measured for each of a plurality of the first thresholds, and work history including the measurement results is stored in the work history database 122.

Figure 13:
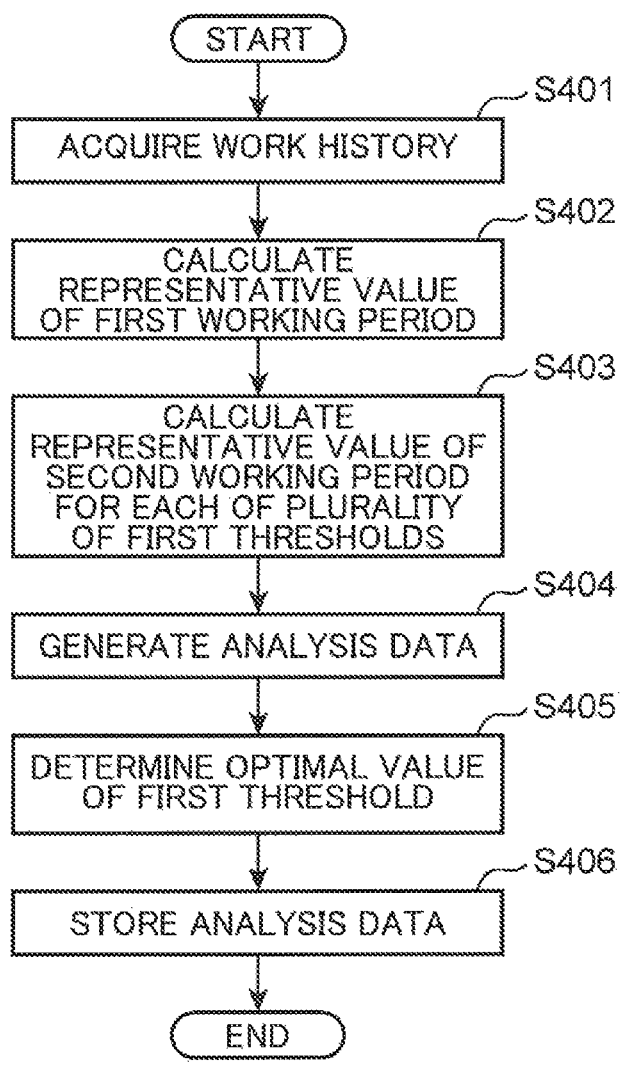
FIG. 13 is a view illustrating an example of processing in which the server generates analysis data in the second embodiment.

FIG. 13 is a view illustrating an example of processing in which the server 100 generates analysis data in the second embodiment. Processing in step S401 and step S402 is the same as the processing in step S201 and step S202 in FIG. 5.

In step S403, the analysis data generating unit 113 classifies the work history acquired in step S401 for each of a plurality of first thresholds, and calculates the representative value of the second working period for each of the plurality of first thresholds.

In step S404, the analysis data generating unit 113 generates analysis data including the representative value of the first working period and the representative value of the second working period calculated for each of the plurality of first thresholds. With this, the analysis data illustrated in FIG. 14 is generated.

In step S405, the analysis data generating unit 113 determines an optimal value of the first threshold among the plurality of first thresholds in the analysis data generated in step S404. In the example in FIG. 14, since the second working period corresponding to the first threshold TH1_2 is the shortest, the first threshold TH1_2 is determined as the optimal value of the first threshold.

In step S406, the analysis data generating unit 113 stores the analysis data generated in step S404 in the analysis database 123 in association with information indicating the optimal value of the first threshold determined in step S405 and the identifier of the target recognizer.

Thus, according to the present embodiment, the second working period is measured while a first threshold, which is to be used for determination as to whether or not to set advance annotation data to a recognition target and which is to be used for comparison with reliability of the recognition result, is changed, and an optimal value of the first threshold is determined based on the measured second working period. Therefore, according to this configuration, it is possible to determine an optimal value of the first threshold which enables the second work to be efficiently performed.

Third Embodiment

A third embodiment is an embodiment in which an optimal value of second threshold information regarding a size of a region indicated by the region information is determined.

In a case where the recognition target is recognized from image data, the target recognizer sets region information in a case where a size of a region indicated by the region information to be set for the recognized recognition target is within a range between a lower limit threshold and an upper limit threshold included in the second threshold information. Recognition accuracy of the target recognizer becomes lower as the size of an object appearing on the image data is excessively small or excessively large. Therefore, by providing a threshold for the size of the region, it is possible to prevent the target recognizer from erroneously detecting the recognition target.

Note that the size of the region may indicate at least one of a height, a width, and an area of the region. Further, in a case where the region information output by the target recognizer is not a rectangle, at least one piece of information of a height, a width, or an area of a bounding rectangle of the region may be employed as the size of the region.

FIG. 2 will be referred to. In the present embodiment, the second measuring unit 112 sets a plurality pieces of second threshold information, measures the second working period for each of the plurality pieces of second threshold information, generates work history based on the measurement results, and stores the work history in the work history database 122.

In the present embodiment, the analysis data generating unit 113 acquires the second working period measured for each of the plurality pieces of second threshold information from the work history database 122, calculates the representative value of the second working period for each of the plurality pieces of second threshold information to generate analysis data, and stores the analysis data in the analysis database 123. Then, the analysis data generating unit 113 determines a second threshold information with which the second working period is the shortest in the generated analysis data, as an optimal value of the second threshold information.

In the present embodiment, the comparing unit 114 acquires the analysis data from the analysis database 123, and compares the first working period with the second working period corresponding to the optimal value of the second threshold information, included in the analysis data, to compare speed of the first work with speed of the second work.

In the present embodiment, in a case where it is determined that the second work is faster than the first work, the presenting unit 115 generates advance annotation data for the image data X4 by causing the target recognizer to execute image recognition of the image data X4 using the optimal value of the second threshold information and inputting the recognition result to the annotation setter. Then, the presenting unit 115 transmits the image data X4, and the advance annotation data for the image data X4 to the worker terminal 200 via the communication unit 130.

Figure 15:
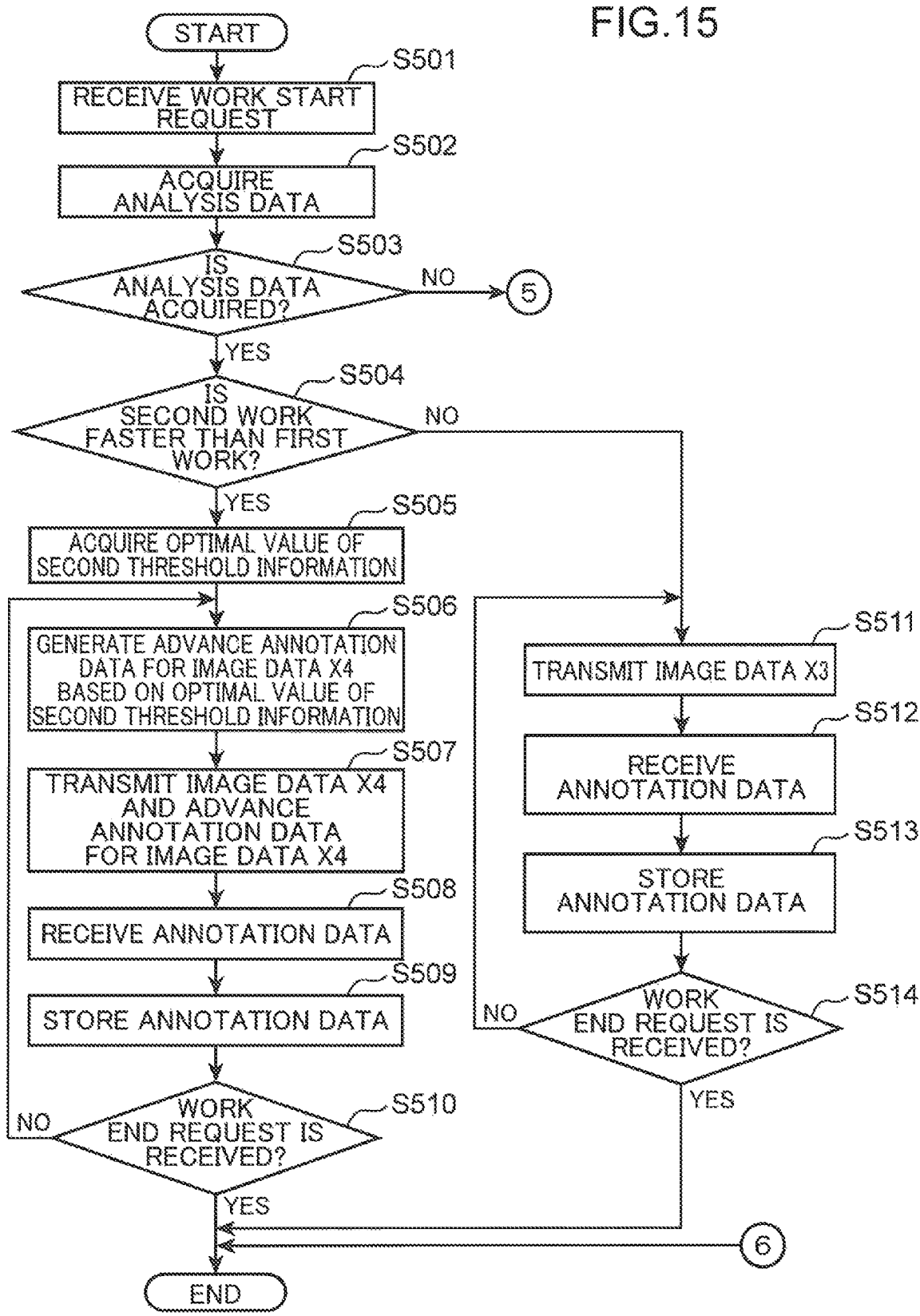
FIG. 15 is a flowchart illustrating an example of processing in a case where a server causes a worker to perform annotation work in a third embodiment.
Figure 16:
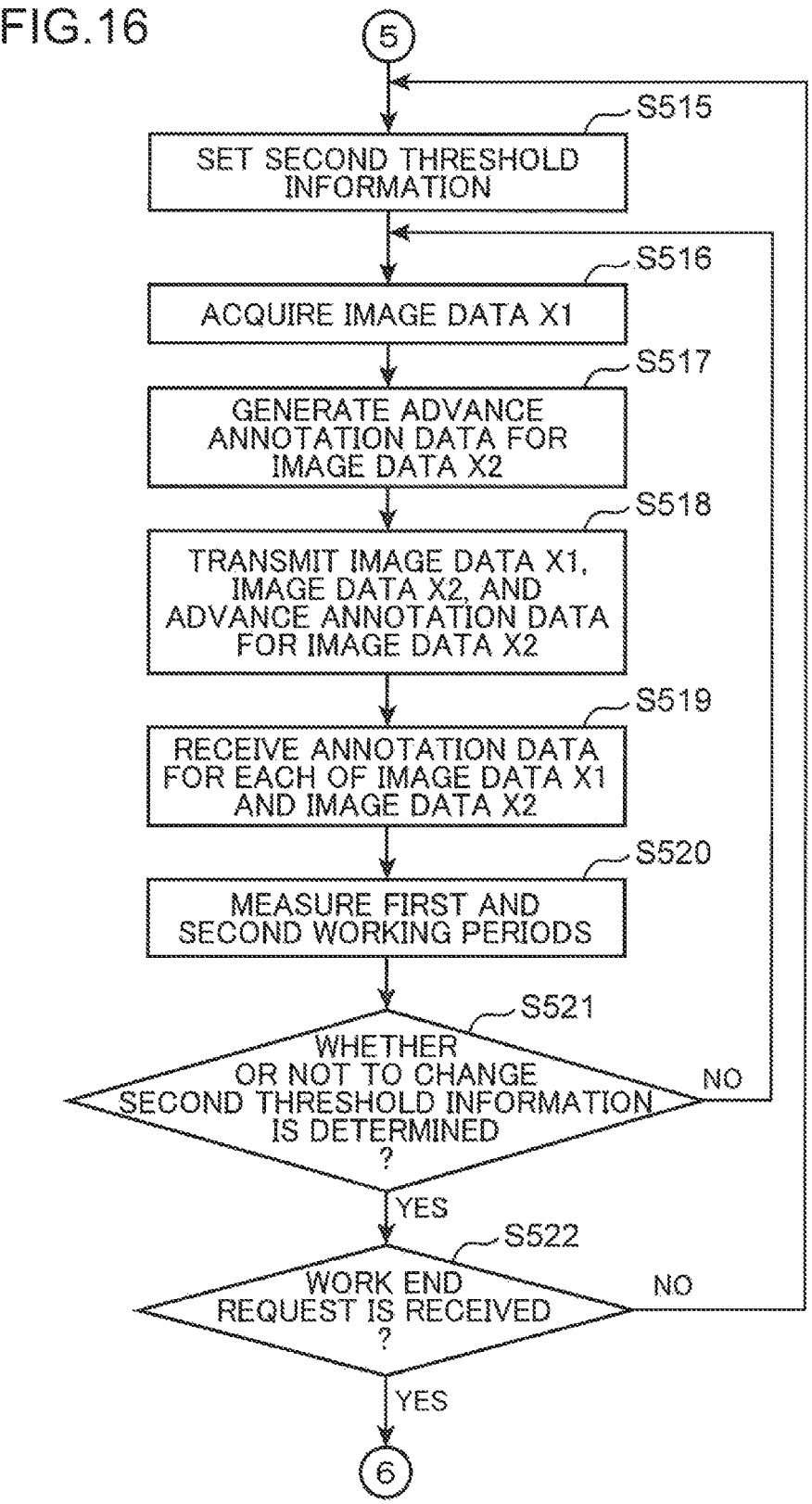
FIG. 16 is a flowchart which is a continuation of FIG. 1S.

FIG. 15 is a flowchart illustrating an example of processing in a case whom the server 100 causes a worker to perform annotation work in the third embodiment. FIG. 16 is a flowchart which is a continuation of FIG. 15. Processing in step S501 and S502 is the same as the processing in step S101 and S102 in FIG. 3. However, in step S502, the analysis data illustrated in FIG. 18 is acquired. FIG. 18 is a view illustrating an example of the analysis data in the third embodiment.

The analysis data illustrated in FIG. 18 includes a first working period and a second working period for each of a plurality pieces of second threshold information. In the measurement phase of the present embodiment, a plurality of second working periods am measured for each of the plurality pieces of second threshold information while the second threshold information is changed. Then, the analysis data is generated by the representative value of the second working period being calculated for each of the plurality pieces of second threshold information from the measurement results. Therefore, in the analysis data illustrated in FIG. 18, the second working period indicates the representative value of the second working period for each of the plurality pieces of second threshold information. Here, the analysis data includes second working periods for respective n (where n is an integer equal to or greater than 2) second threshold information TH2 of the second threshold information TH2_1, TH2_2, . . . , TH2_*n*.

Further, in the measurement phase, the second threshold information corresponding to the representative value of the shortest second working period among the representative values of the second working periods calculated for each of the second threshold information is determined as the optimal value of the second threshold information. In the example in FIG. 18, the second threshold information TH22 indicated with an arrow is determined as the optimal value of the second threshold information.

Meanwhile, the target recognizer is not used in measurement of the first working period. Therefore, in the analysis data illustrated in FIG. 18, the first working period is not calculated for each of the second threshold information TH2.

Further, in the analysis data illustrated in FIG. 18, the identifier of the target recognizer is associated with each of the first working period and the second working period.

Processing in step S503 is the same as the processing in step S103 in FIG. 3. In step S504, the comparing unit 114 compares speed of the first work with speed of the second work with reference to the analysis data.

In the example in FIG. 18, since the second threshold information TH2_2 is the optimal value, the second working period measured with the second threshold information TH2_2 is compared with the first working period. Then, if the second working period of the second threshold information TH2_2 is shorter than the first working period, it is determined that the second work is faster than the first work (step S504: YES), and the processing proceeds to step S505. Meanwhile, if the first working period is shorter than the second working period measured with the second threshold information TH2_2, it is determined that the first work is faster than the second work (step S504: NO), and the processing proceeds to step S511.

In step S505, the comparing unit 114 acquires the optimal value of the second threshold information from the analysis data. In the example in FIG. 18, the second threshold information TH2_2 is acquired as the optimal value.

In step S506, the presenting unit 115 acquires one piece of image data on which work is to be performed from the image database 121 as the image data X4, and generates advance annotation data for the image data X4 by causing the target recognizer to execute image recognition on the image data X4 using the optimal value of the second threshold information, and inputting the recognition result to the annotation setter. In this case, region information indicating a size of the region less than the lower limit threshold of the second threshold information or region information indicating a size of the region greater than the upper limit threshold of the second threshold information are not set.

Processing from step S507 to step S510 is the same as the processing from step S106 to step S109 in FIG. 3. Processing from step S511 to step S514 is the same as the processing from step S110 to step S113 in FIG. 3.

In step S515, the second measuring unit 112 sets the second threshold information. In this case, the second threshold information is sequentially set so that each of the upper limit threshold and the lower limit threshold increases or decreases by a predetermined step width within a numerical value range determined in advance. For example, the second measuring unit 112 increases or decreases the lower limit threshold by a predetermined step width within the numerical value range of the lower limit threshold determined. In advance in a state where the upper limit threshold is fixed at a value within the numerical value range of the upper limit threshold determined in advance. Then, if all settings within the numerical value range of the lower limit value are finished, then, the second measuring unit 112 only needs to set the second threshold information by repeating processing of increasing or decreasing the lower limit threshold by a predetermined step width within the numerical value range of the lower limit threshold in a state where the upper limit threshold is fixed at a value by increasing or decreasing the upper limit threshold by a predetermined step width. Alternatively, the second measuring unit 112 may set the second threshold information by increasing or decreasing only one of the upper limit threshold and the lower limit threshold by a predetermined step width within the numerical value range determined in advance while setting the other of the upper limit threshold and the lower limit threshold at a fixed value.

Processing in step S516 is the same as the processing in step S114 in FIG. 4. In step S517, the second measuring unit 112 acquires one piece of image data from the image database 121 as the image data X2, and generates advance annotation data for the image data X2 by causing the target recognizer to execute image recognition on the image data X2 using the optimal value of the second threshold information set in the step S515 and inputting the recognition result to the annotation setter.

Processing from step S518 to step S520 is the same as the processing from step S116 to step S118 in FIG. 4.

In step S521, the second measuring unit 112 determines whether or not to change the second threshold information. In a case where a predetermined number of measurement results of the first working periods and the second working periods are obtained for the second threshold information set in step S515, the second measuring unit 112 determines to change the second threshold information (step S521: YES), and the processing proceeds to step S522. Meanwhile, in a case where a predetermined number of measurement results of the first working periods and the second working periods are not obtained, the second measuring unit 112 determines not to change the second threshold information (step S521: NO), and the processing returns to step S516. With this, the processing from step S516 to step S521 is repeated until the predetermined number of measurement results of the first working periods and the second working periods are obtained for the one second threshold information set in step S515.

In step S522, in a case where it is determined that the communication unit 130 has received a work end request (step S522: YES), the work result acquiring unit 116 finishes the processing. Meanwhile, in a case where it is determined that the communication unit 130 has not received a work end request (step S522: NO) the work result acquiring unit 116 returns the processing to step S515. With this, the next second threshold information is set in step S515, and the processing in step S516 and subsequent steps is executed.

As described above, in the measurement phase, the image data X1 and the image data X2 are sequentially transmitted to the first worker terminal, a predetermined number of the first working period and the second working period are sequentially measured for each of a plurality pieces of the second threshold information, and work history including the measurement results is stored in the work history database 122.

Figure 17:
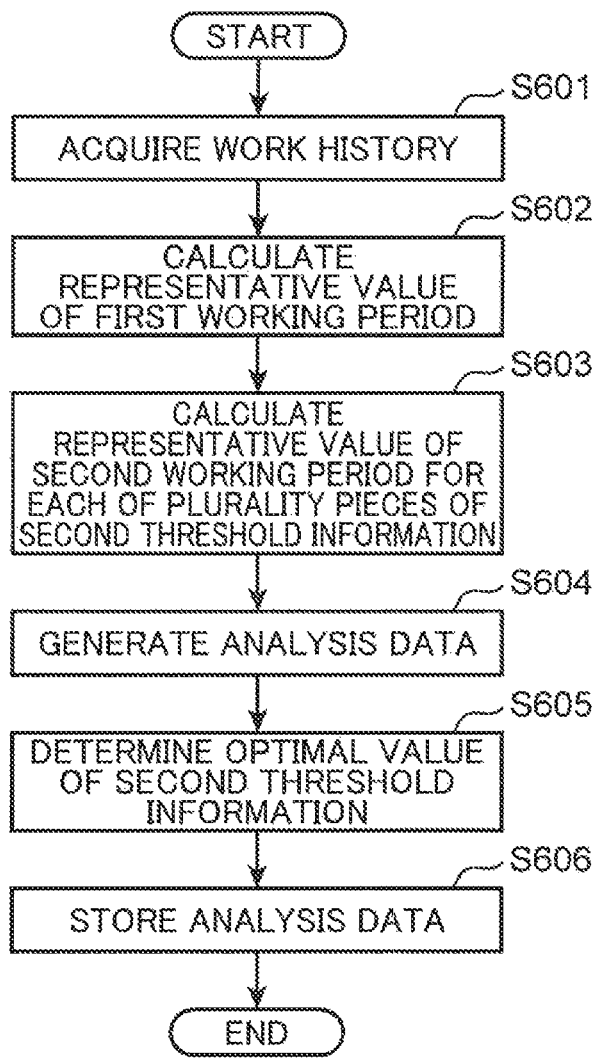
FIG. 17 is a view illustrating an example of processing in which the server generates analysis data in the third embodiment.

FIG. 17 is a view illustrating an example of processing in which the server 100 generates analysis data in the third embodiment. Processing in step S601 and step S602 is the same as the processing in step S201 and step S202 in FIG. 5.

In step S603, the analysis data generating unit 113 classifies the work history acquired in step S601 for each of a plurality pieces of second threshold information, and calculates the representative value of the second working period for each of the plurality pieces of second threshold information.

In step S604, the analysis data generating unit 113 generates analysis data including the representative value of the first working period and the representative value of the second working period calculated for each of the plurality pieces of second threshold information. With this, the analysis data illustrated in FIG. 18 is generated.

In step S605, the analysis data generating unit 113 determines an optimal value of the second threshold information among the plurality pieces of second threshold information in the analysis data generated in step S604. In the example in FIG. 18, since the second working period corresponding to the second threshold information TH22 is the shortest, the second threshold information TH2_2 is determined as the optimal value of the second threshold information.

In step S606, the analysis data generating unit 113 stores the analysis data generated in step S604 in the analysis database 123 in association with information indicating the optimal value of the second threshold information determined in step S605 and the identifier of the target recognizer used for annotation work.

As described above, in the present embodiment, the optimal value of the second threshold information regarding a size of a region indicated by the region information is determined, and speed of the first work is compared with speed of the second work based on the second working period in a case where advance annotation data is set using the determined optimal value of the second threshold information and the first working period. Therefore, according to the present embodiment, since it is possible to determine work having higher work efficiency out of the first work and the second work and cause the worker to perform the determined work, it is possible to reduce work cost for annotation work more reliably.

Fourth Embodiment

A fourth embodiment is an embodiment in which the optimal value of the first threshold described in the second embodiment is determined for each class of the recognition target. Hereinafter, in the present embodiment, a threshold regarding reliability will be described as a third threshold.

FIG. 2 will be referred to. In the present embodiment, the second measuring unit 112 sets a plurality of third thresholds for each of a plurality of classes, measures a plurality of second working periods for each of the plurality of third thresholds for each of the plurality of classes, generates work history based on measurement results, and stores the work history in the work history database 122.

In the present embodiment, the analysis data generating unit 113 acquires the plurality of second working periods measured for each of the plurality of third thresholds for each of the plurality of classes from the work history database 122, calculates representative values of the second working periods for each of the plurality of third thresholds for each of the plurality of classes to generate analysis data, and stores the analysis data in the analysis database 123. The analysis data generating unit 113 then determines a third threshold with which the second working period becomes the shortest for each of the plurality of classes in the generated analysis data, as an optimal value of the third threshold.

In the present embodiment, the comparing unit 114 acquires the analysis data from the analysis database 123, and compares the first working period with the second working period for each of the plurality of classes, included in the analysis data, to compare speed of the first work with speed of the second work.

In the present embodiment, in a case where it is determined that the second work is faster than the first work, the presenting unit 115 generates advance annotation data for the image data X4 by causing the target recognizer to execute image recognition on the image data X4 using respective optimal values of the third threshold for each of the plurality of classes and inputting the recognition result to the annotation setter. Then, the presenting unit 115 transmits the image data X4, and the advance annotation data for the image data X4 to the worker terminal 200 via the communication unit 130.

Figure 19:
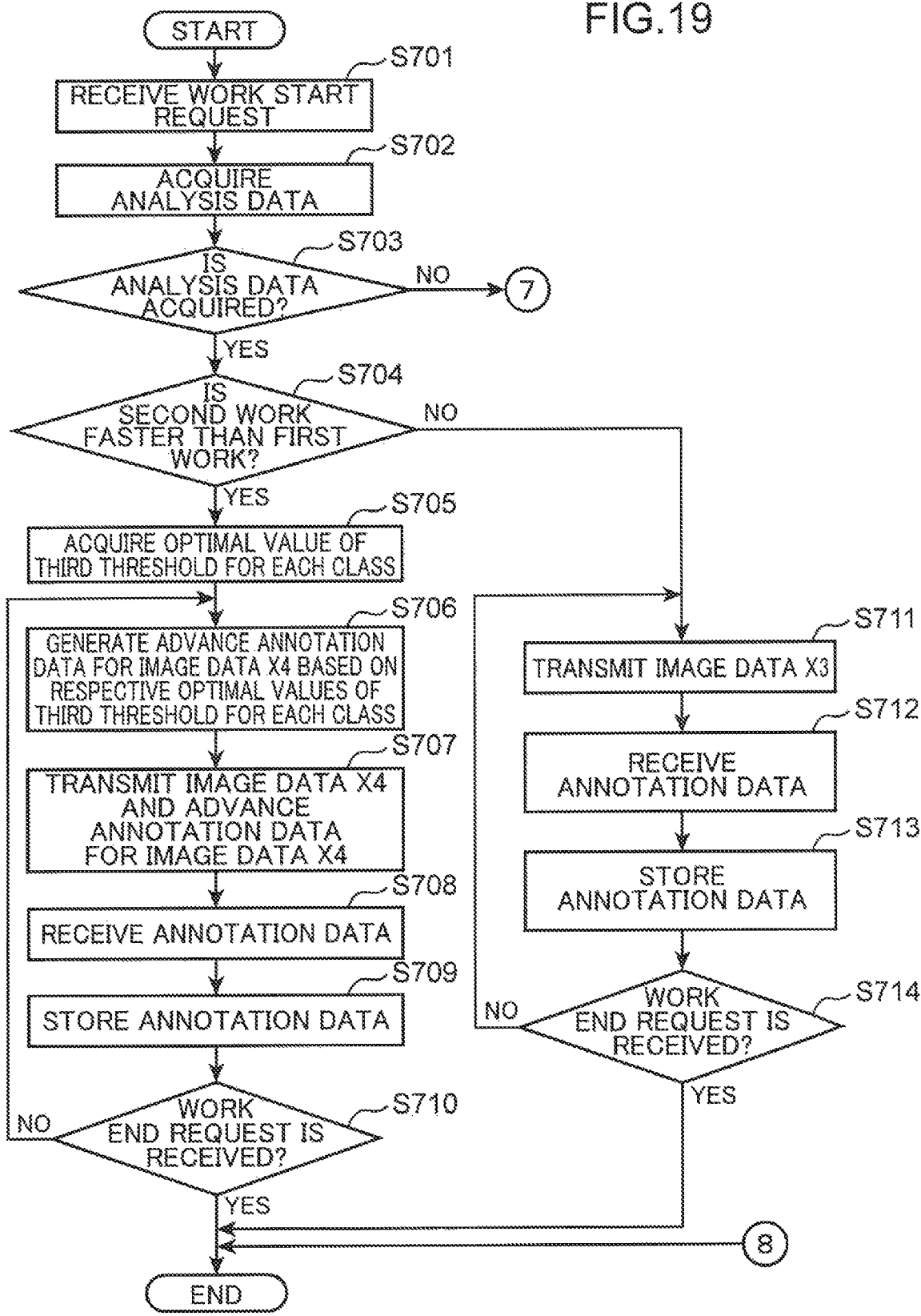
FIG. 19 is a flowchart illustrating an example of processing in a case where a server causes a worker to perform annotation work in a fourth embodiment.
Figure 20:
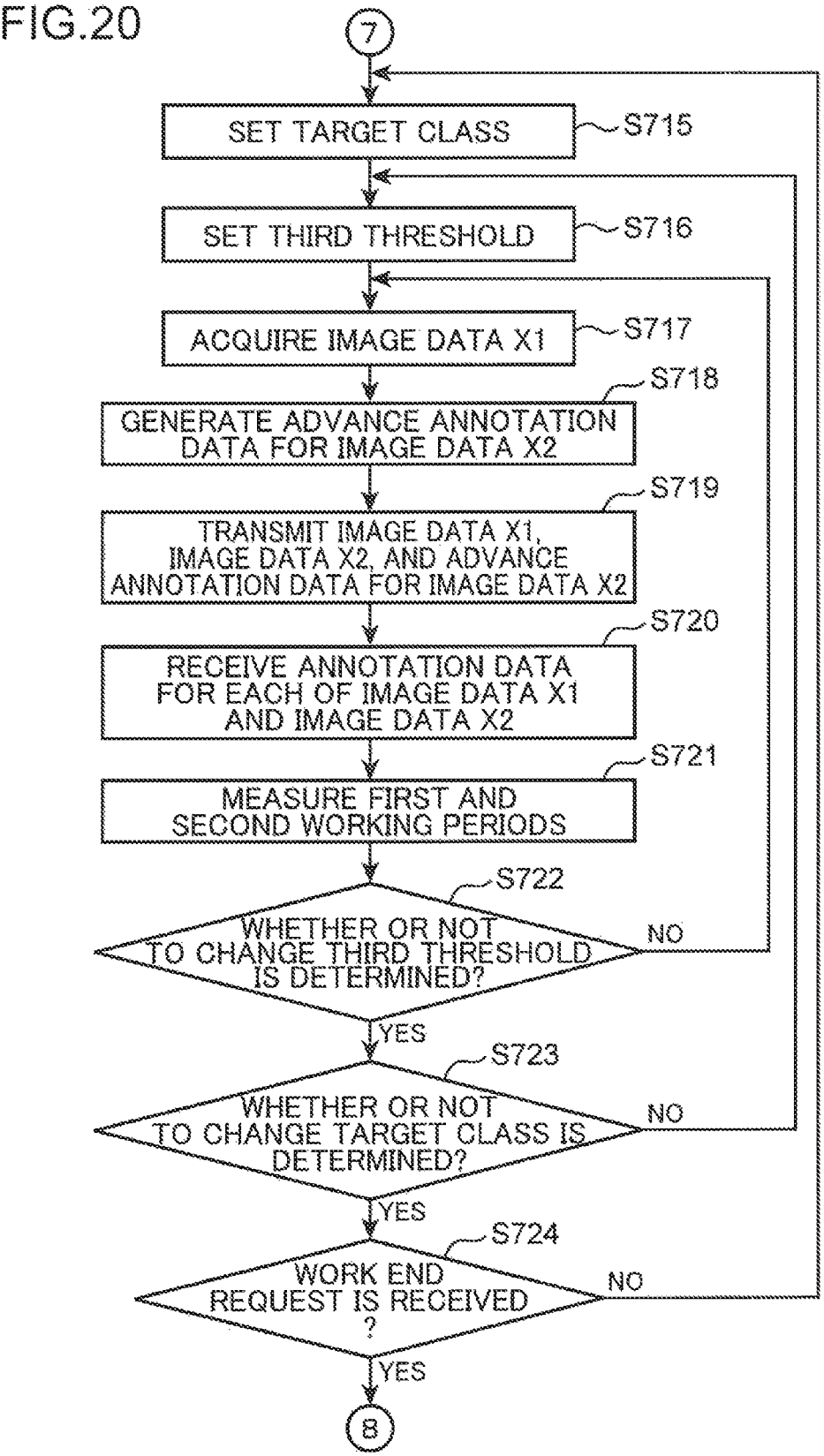
FIG. 20 is a flowchart which is a continuation of FIG. 19.

FIG. 19 is a flowchart illustrating an example of processing in a case where the server 100 causes a worker to perform annotation work in the fourth embodiment. FIG. 20 is a flowchart which is a continuation of FIG. 19. Processing in step S701 and S702 is the same as the processing in step S101 and S102 in FIG. 3. However, in step S702, the analysis data illustrated in FIG. 22 is acquired. FIG. 22 is a view illustrating an example of the analysis data in the fourth embodiment.

The analysis data illustrated in FIG. 22 includes the first working period, and the second working periods for each of the plurality of third threshold for each of the plurality of classes. In the measurement phase in the present embodiment, a plurality of second working periods are measured for each of the plurality of third thresholds for each of the plurality of classes while the third threshold is changed for each of the plurality of classes. Then, analysis data is generated by representative values of the second working periods being calculated for each of the plurality of third thresholds for each of the plurality of classes from the measurement results. Therefore, in the analysis data illustrated in FIG. 22, the second working periods in the respective plurality of classes indicate the representative values of the second working periods for each of the plurality of third thresholds. Here, the analysis data includes second working periods respectively for n (n is an integer equal to or greater than 2) third thresholds TH3 for each of the plurality of classes such that second working periods for third thresholds TH3_1, TH3_2, . . . , TH3_n are included for the recognition target of a class Y1, and second working periods for third thresholds TH3_1, TH3_2, . . . , TH3_n are included for the recognition target of a class Y2.

Further, in the measurement phase, the third threshold corresponding to the representative value of the shortest second working period among the representative values of the second working periods measured for each of the third thresholds for each of the plurality of classes, is determined as the optimal value of the third threshold. In the example in FIG. 22, the third threshold TH3_2 indicated with an arrow is determined as the optimal value of the third threshold for the recognition target of the class Y1, and the third threshold TH3_1 indicated with an arrow is determined as the optimal value of the third threshold for the recognition target of the class Y2.

Meanwhile, the target recognizer is not used in measurement of the first working period. Therefore, in the analysis data illustrated in FIG. 22, the first working period is not calculated for each of the third thresholds TH3.

Further, in the analysis data illustrated in FIG. 22, the identifier of the target recognizer is associated with each of the first working period and the second working period.

Processing in step S703 is the same as the processing in step S103 in FIG. 3. In step S704, the comparing unit 114 compares speed of the first work with speed of the second work with reference to the analysis data.

In the example in FIG. 22, since the third threshold TH3_2 is an optimal value for the class Y1, and the third threshold TH3_1 is an optimal value for the class Y2, an average period of the second working period of the third threshold TH3_2 of the class Y1 and the second working period of the class Y2 is calculated. Then, the average period of the second working periods is compared with the first working period. If the average period of the second working periods is shorter than the first working period, it is determined that the second work is faster than the first work (step S704: YES), and the processing proceeds to step S705. Meanwhile, if the first working period is shorter than the average period of the second working periods, it is determined that the first work is faster than the second work (step S704: NO), and the processing proceeds to step S711.

In step S705, the comparing unit 114 acquires the optimal value of the third threshold for each of the plurality of classes from the analysis data. In the example in FIG. 22, the third threshold TH3_2 is acquired as the optimal value for the class Y1, and the third threshold TH3_1 is acquired as the optimal value for the class Y2.

In step S706, the presenting unit 115 acquires one piece of image data on which work is to be performed from the image database 121 as the image data X4, and generates advance annotation data for the image data X4 by causing the target recognizer to perform image recognition on the image data X4 using respective optimal values of the third threshold for each class acquired in step S705, and inputting the recognition results to the annotation setter. In this case, concerning the class Y1, if a value of the reliability is equal to or greater than the third threshold TH3_2, advance annotation data is set, and, concerning the class Y2, if the value of the reliability is equal to or greater than the third threshold TH3_1, advance annotation data is set.

Processing from step S707 to step S710 is the same as the processing from step S106 to step S109 in FIG. 3. Processing from step S711 to step S714 is the same as the processing from step S110 to step S113 in FIG. 3.

In step S715, the second measuring unit 112 sets a target class. In this case, one class which is selected in predetermined order from a plurality of classes determined in advance is set as the target class.

In step S716, the second measuring unit 112 sets the third threshold. In this case, the third threshold is sequentially set so as to increase or decrease by a predetermined step width within a numerical value range determined in advance.

Processing in step S717 is the same as the processing in step S114 in FIG. 4. In step S718, the second measuring unit 112 acquires one piece of image data from the image database 121 as the image data X2, and generates advance annotation data for the image data X2 by causing the target recognizer to execute image recognition on the image data X2 using the optimal value of the third threshold set in the step S716 and inputting the recognition result to the annotation setter.

Processing from step S719 to step S721 is the same as the processing from step S116 to step S118 in FIG. 4.

In step S722, the second measuring unit 112 determines whether or not to change the third threshold. In a case where measurement results of a predetermined first number of working periods and the second working periods are obtained for the third threshold set in step S716, the second measuring unit 112 determines to change the third threshold (step S722: YES), and the processing proceeds to step S723. Meanwhile, in a case where measurement results of the predetermined first number of the first working periods and the second working periods are not obtained, the second measuring unit 112 determines not to change the third threshold (step S722: NO), and the processing returns to step S717. With this, the processing from step S717 to step S722 is repeated until the measurement results of the predetermined first number of the first working periods and the second working periods are obtained for the one third threshold set in step S716.

In step S723, the second measuring unit 112 determines whether or not to change the target class. In a case where measurement results of a predetermined second number (>the first number) of the first working periods and the second working periods are obtained for the target class set in step S715, the second measuring unit 112 determines to change the target class (step S723: YES), and the processing proceeds to step S724. Meanwhile, in a case where measurement results of the predetermined second number of the first working periods and the second working periods are not obtained, the second measuring unit 112 determines not to change the target class (step S723: NO), and the processing returns to step S716. With this, the processing from step S716 to step S723 is repeated until the measurement results of the predetermined second number of the first working periods and the second working periods are obtained for the target class set in step S715.

In step S724, in a case where it is determined that the communication unit 130 has received a work end request (step S724: YES), the work result acquiring unit 116 finishes the processing. Meanwhile, in a case where it is determined that the communication unit 130 has not received a work end request (step S724: NO) the work result acquiring unit 116 returns the processing to step S715. With this, the next target class is set in step S715, and the processing in step S716 and subsequent steps is executed.

As described above, in the measurement phase, the image data X1, the image data X2, and the advance annotation data for the image data X2 are sequentially transmitted to the first worker terminal, and the predetermined first number of first working periods and second working periods for each of the plurality of third thresholds are sequentially measured for each of the plurality of classes, and work history including the measurement results is stored in the work history database 122.

Figure 21:
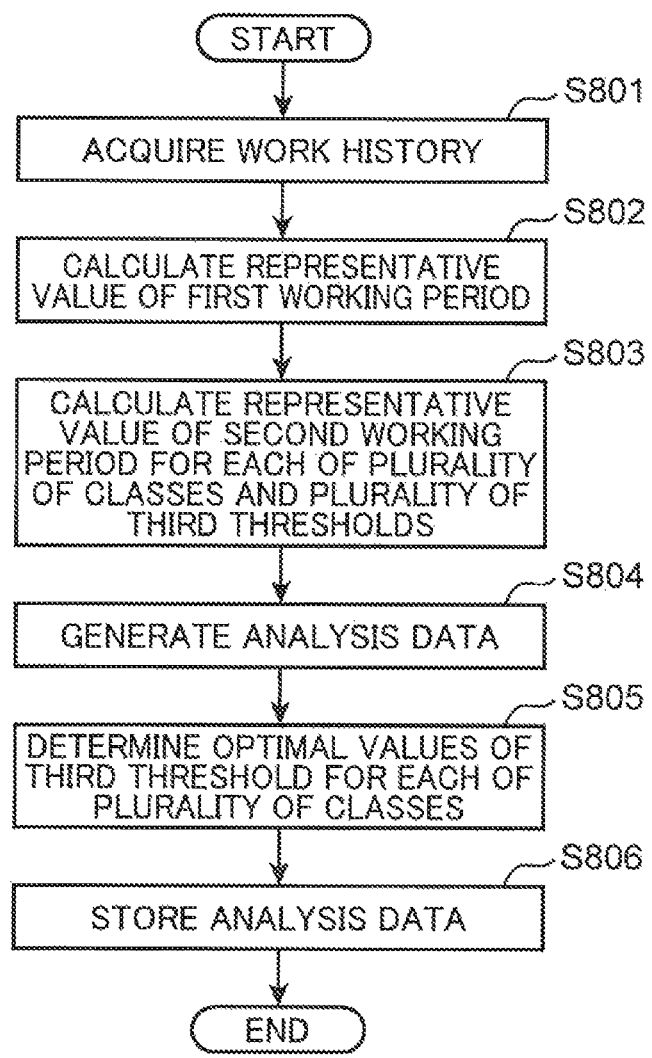
FIG. 21 is a view illustrating an example of processing in which the server generates analysis data in the fourth embodiment.

FIG. 21 is a view illustrating an example of processing in which the server 100 generates analysis data in the fourth embodiment. Processing in step S801 and step S802 is the same as the processing in step S201 and step S202 in FIG. 5.

In step S803, the analysis data generating unit 113 classifies the work history acquired in step S801 for each of a plurality of third thresholds for respective plurality of classes, and calculates the representative value of the second working period for each of the plurality of classes and the plurality of third thresholds.

In step S804, the analysis data generating unit 113 generates analysis data including the representative value of the first working period and the representative value of the second working period calculated for each of the plurality of third thresholds for respective plurality of classes. With this, the analysis data illustrated in FIG. 22 is generated.

In step S805, the analysis data generating unit 113 determines the optimal values of the third threshold for each of the plurality of classes in the analysis data generated in step S804. In the example in FIG. 22, since the second working period corresponding to the third threshold TH3_2 is shortest for the class Y1, and the second working period of the third threshold TH3_1 is the shortest for the class Y2, the third threshold TH3_2 is determined as the optimal value of the third threshold for the class Y1, and the third threshold TH3_1 is determined as the optimal value of the third threshold for the class Y2.

In step S806, the analysis data generating unit 113 stores the analysis data generated in step S804 in the analysis database 123 in association with information indicating the optimal value of the third threshold for respective plurality of classes determined in step S805 and the identifier of the target recognizer.

In this manner, according to the present embodiment, since the optimal value of the third threshold is determined for each of the plurality of classes, it is possible to determine the optimal value of the third threshold with which the second work can be performed efficiently.

Fifth Embodiment

A fifth embodiment is an embodiment in which speed of the first work is compared with speed of the second work for each of a plurality of image capturing scenes (an example of image attribute information). FIG. 2 will be referred to. In the present embodiment, the first measuring unit 111 measures a plurality of first working periods for each of the plurality of image capturing scenes, generates work history based on the measurement results, and stores the work history in the work history database 122. The image capturing scene is data indicating surrounding circumstances when the image data is captured. For example, the image capturing scene may be data indicating the weather such as sunny, rainy, cloudy, and snowy, may be data indicating hours such as night time and daytime, or may be data of combination of the weather and the hours.

In the present embodiment, the second measuring unit 112 measures a plurality of second working periods for each of a plurality of image capturing scenes, generates work history based on the measurement results, and stores the work history in the work history database 122.

In the present embodiment, the analysis data generating unit 113 acquires the plurality of first working periods measured for each of the plurality of image capturing scenes from the work history database 122, and calculates representative values of the first working periods for each of the plurality of image capturing scenes. Further, the analysis data generating unit 113 acquires the plurality of second working periods measured for each of the plurality of image capturing scenes from the work history database 122 and calculates representative values of the second working periods for each of the plurality of image capturing scenes. The analysis data generating unit 113 then generates analysis data including the representative values of the first working periods calculated for each of the plurality of image capturing scenes and the representative values of the second working periods calculated for each of the plurality of image capturing scenes, and stores the analysis data in the analysis database 123.

In the present embodiment, the comparing unit 114 specifies an image capturing scene of the image data on which work is to be performed, which is one piece of image data which is acquired by the presenting unit 115 from the image database 121 and on which work is to be performed. The image data stored in the image database 121 includes meta-information for specifying the image capturing scene. Therefore, the comparing unit 114 only needs to specify the image capturing scene based on the meta-information. The meta-information may be information indicating the image capturing scene itself, or may be information indicating an image capturing location and image capturing time. In a case where the meta-information is information indicating an image capturing location and image capturing date and time, the comparing unit 114 only needs to acquire weather corresponding to the image capturing location and the image capturing date and time indicated by the meta-information from a weather information server, and specify the image capturing scene based on the acquired weather.

Further, the comparing unit 114 acquires the first working period and the second working period corresponding to the image capturing scene of the image data on which work is to be performed from the analysis data stored in the analysis database 123, and determines that the first work is faster than the second work if the first working period is shorter than the second working period. Meanwhile, the comparing unit 114 determines that the second work is faster then the first work if the second working period corresponding to the image capturing scene of the image data on which work is to be performed is shorter than the first working period.

In the present embodiment, in a case where it is determined that the second work is faster than the first work, the presenting unit 115 sets the image data X4 as the image data on which work is to be performed, and generates advance annotation data for the image data X4. Then, the presenting unit 115 transmits the image data X4, and the advance annotation data for the image data X4 to the worker terminal 200 via the communication unit 130. Meanwhile, in a case where it is determined that the first work is faster than the second work, the presenting unit 115 sets the image data X3 as the image data on which work is to be performed, in which advance annotation data is not set, and transmits the image data X3 to the worker terminal 200 via the communication unit 130.

Figure 23:
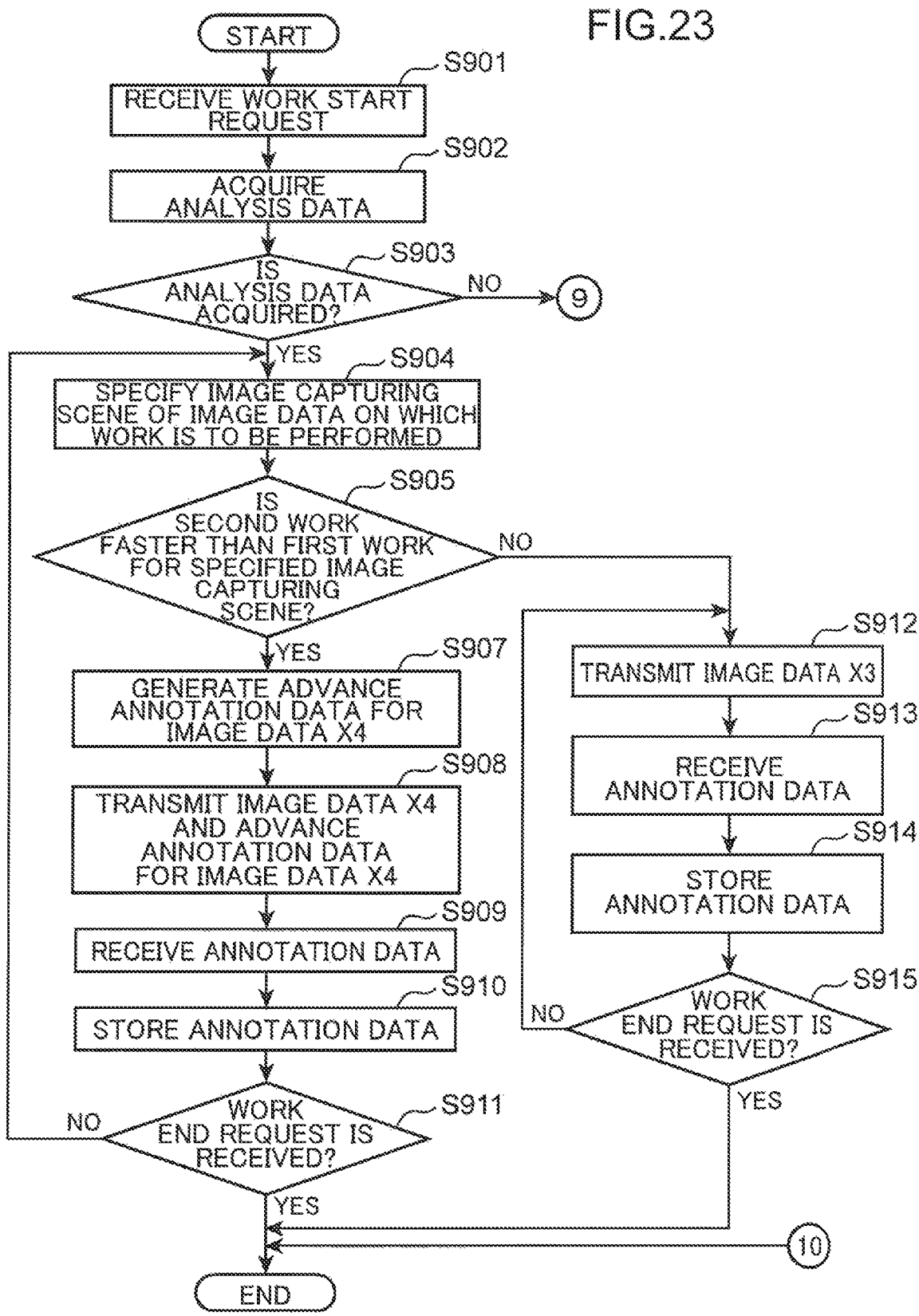
FIG. 23 is a flowchart illustrating an example of processing in a case where a server causes a worker to perform annotation work in a fifth embodiment.
Figure 24:
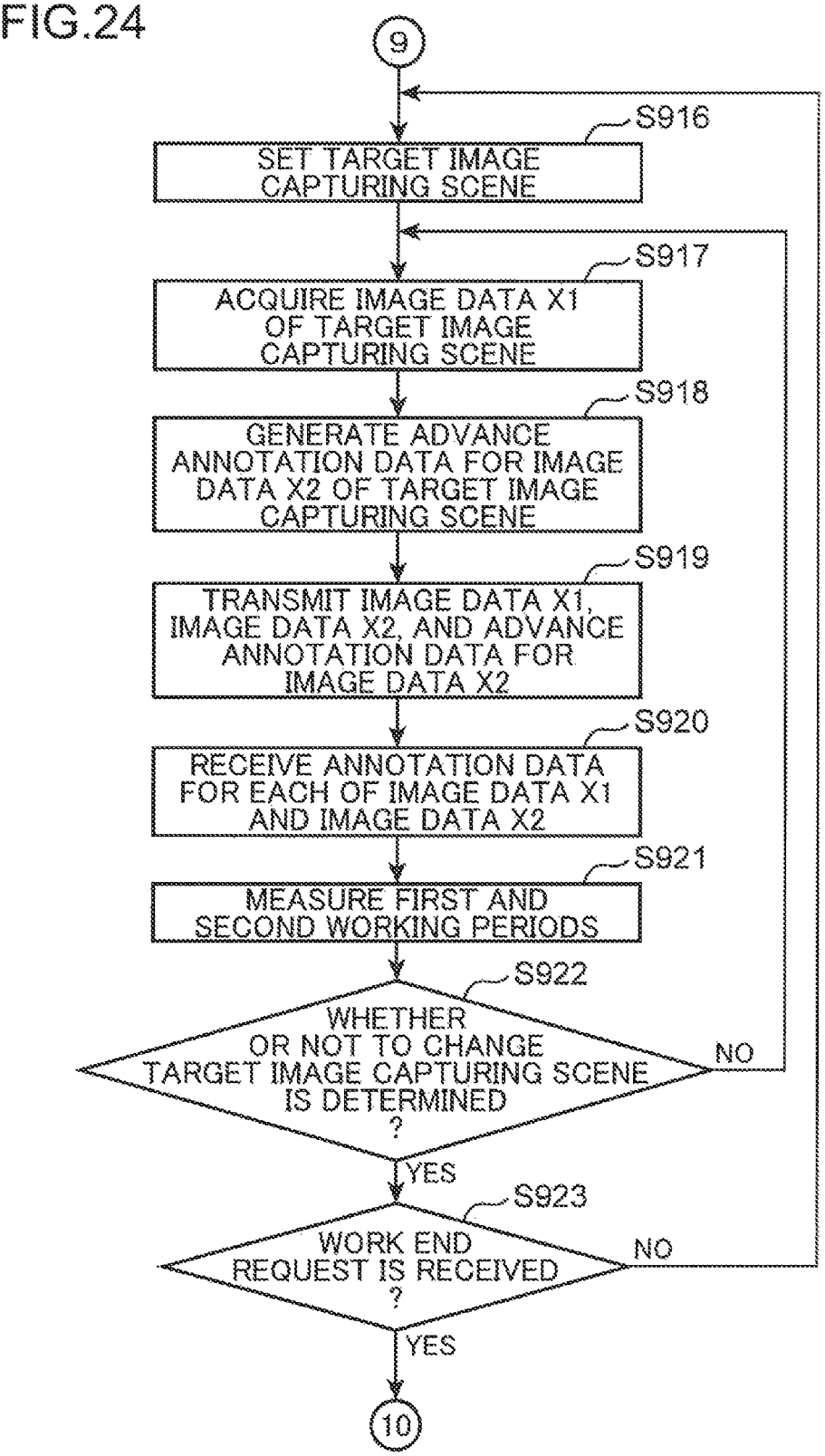
FIG. 24 is a flowchart which is a continuation of FIG. 23.

FIG. 23 is a flowchart illustrating an example of processing in a case where the server 100 causes a worker to perform annotation work in the fifth embodiment. FIG. 24 is a flowchart which is a continuation of FIG. 23. Processing in step S901 and S902 is the same as the processing in step S101 and S102 in FIG. 3. However, in step S902, the analysis data illustrated in FIG. 26 is acquired. FIG. 26 is a view illustrating an example of the analysis data in the fifth embodiment.

The analysis data illustrated in FIG. 26 includes the first working periods and the second working periods respectively corresponding to the plurality of image capturing scenes. Here, the analysis data includes the first working periods and the second working periods for n image capturing scenes of image capturing scenes Z1, Z2, . . . , Zn.

In the measurement phase, a plurality of first working periods am measured for each of the plurality of image capturing scenes, and representative values of the first working periods are calculated from the measurement results. Further, a plurality of second working periods are measured for each of the plurality of image capturing scenes, and representative values of the second working periods are calculated from the measurement results. Therefore, in the analysis data illustrated in FIG. 26, the first working period indicates the representative value of the first working period calculated for each of the image capturing scenes, and the second working period indicates the representative value of the second working period calculated for each of the image capturing scenes. Further, the identifier of the target recognizer is associated with the analysis data illustrated in FIG. 26.

Processing in step S903 is the same as the processing in step S103 in FIG. 3. In step S904, the comparing unit 114 specifies the image capturing scene of the image data on which work is to be performed.

In step S905, the comparing unit 114 compares speed of the first work with speed of the second work by comparing the first working period and the second working period, which correspond to the image capturing scene specified in step S904, with reference to the analysis data. In an example in FIG. 26, if it is assumed that the image capturing scene Z1 is specified, the first working period and the second working period which correspond to the image capturing scene Z are compared. Then, if the second working period is shorter than the first working period, it is determined that the second work is faster than the first work (step S905: YES), and the processing proceeds to step S907. Meanwhile, if the first working period is shorter than the second working period, it is determined that the first work is faster than the second work (step S905: NO), and the processing proceeds to step S912.

Processing from step S907 to step S911 is the same as the processing from step S105 to step S109 in FIG. 4. Processing from step S912 to step S915 is the same as the processing from step S110 to step S113 in FIG. 4.

In step S916, the first measuring unit 111 sets a target image capturing scene. In this case, one image capturing scene selected in predetermined order from a plurality of image capturing scenes determined in advance, is set as the target image capturing scene.

In step S917, the first measuring unit 111 acquires one piece of image data of the target image capturing scene from the image database 121 as the image data X1.

In step S918, the second measuring unit 112 acquires one piece of image data of the target image capturing scene from the image database 121 as the image data X2, and generates advance annotation data for the image data X2 by causing the target recognizer to execute image recognition on the image data X2 and inputting the recognition result to the annotation setter.

Processing from step S919 to step S921 is the same as the processing from step S116 to step S11 in FIG. 4.

In step S922, the work result acquiring unit 116 determines whether or not to change the target image capturing scene. In this case, in a case where a predetermined number of first working periods and second working periods can be measured for the target image capturing scene, the work result acquiring unit 116 determines to change the target image capturing scene (step S922: YES), and the processing proceeds to step S923. Meanwhile, in a case where a predetermined number of first work results and second work results cannot be measured for the target image capturing scene, the work result acquiring unit 116 determines not to change the target image capturing scene (step S922: NO), and the processing returns to step S917.

In step S923, the work result acquiring unit 116 determines whether or not the communication unit 130 has received a work end request from the first worker terminal. In a case where it is determined that the communication unit 130 has received a work end request (step S923: YES), the work result acquiring unit 116 finishes the processing.

Meanwhile, in a case where it is determined that the communication unit 130 has not received a work end request (step S923: NO), the work result acquiring unit 116 returns the processing to step S916. With this, the next target image capturing scene is determined, and processing in step S917 and subsequent steps is executed.

As described above, in the measurement phase, the image data X1, the image data X2, the advance annotation data for the image data X2 are sequentially transmitted to the first worker terminal, a predetermined number of the first working period and the second working period are sequentially measured for each of a plurality of the target image capturing scenes, and work history including the measurement results is stored in the work history database 122.

Figure 25:
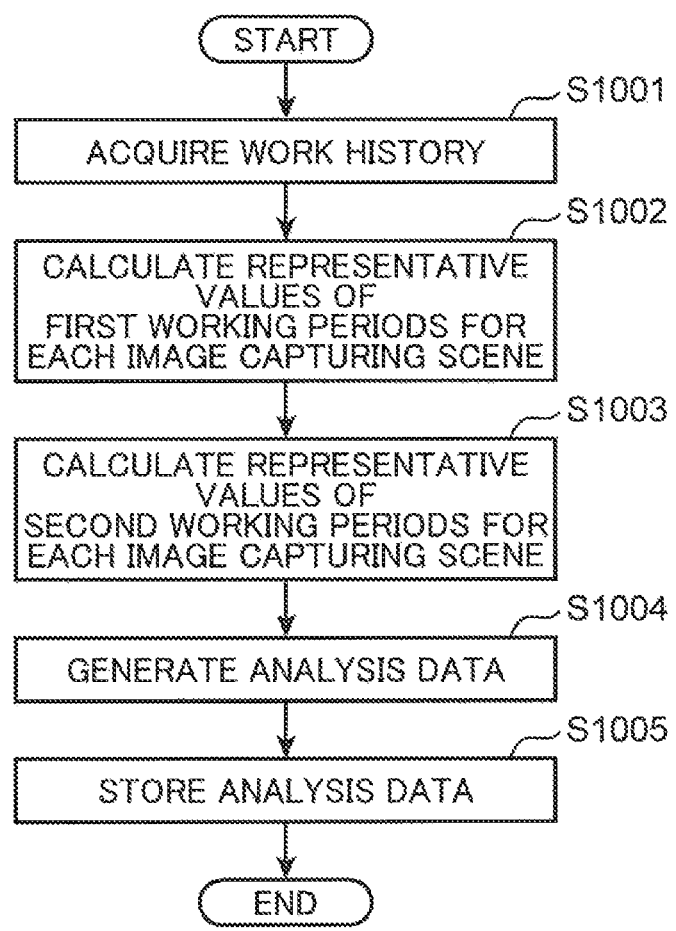
FIG. 25 is a view illustrating an example of processing in which the server generates analysis data in the fifth embodiment.

FIG. 25 is a view illustrating an example of processing in which the server 100 generates analysis data in the fifth embodiment. Processing in step S1001 is the same as the processing in step S201 in FIG. 5.

In step S1002, the analysis data generating unit 113 classifies the work history acquired in step S1001 for each image capturing scene, and calculates representative values of the fast working periods.

In step S1003, the analysis data generating unit 113 classifies the work history acquired in step S1001 for each image capturing scene, and calculates the representative value of the second working period.

In step S1004, the analysis data generating unit 113 generates analysis data including the representative value of the first working period and the representative value of the second working period. With this, the analysis data illustrated in FIG. 26 is generated.

In step S1005, the analysis data generating unit 113 stores the analysis data generated in step S1004 in the analysis database 123 in association with the identifier of the target recognizer.

As described above, according to the present embodiment, since it is possible to determine work having higher work efficiency out of the first work and the second work while taking into account the image capturing scene, and cause the worker to perform the determined work, it is possible to reduce work cost for annotation work more reliably.

Note that while, in the fifth embodiment, the image capturing scene is employed as the image attribute information, the present disclosure is not limited to this, and in place of or in addition to the image capturing scene, image quality may be employed as the image attribute information. The image quality is, for example, information indicating a type of a camera such as a fish-eye camera and an ordinary camera which has captured image data, resolution of image data, a size of image data, or the like.

Modified Example (1) It is possible to arbitrarily combine the first to fifth embodiments. For example, in the third embodiment, advance annotation data is set in a case where a size of the region for the recognition target recognized through image recognition falls within a range between the lower limit threshold and the upper limit threshold of the second threshold information. "Recognized through image recognition" in this case indicates, for example, that a value of the reliability of the recognition result is equal to or greater than a threshold. Further, as the "threshold of the reliability" in this case, the first threshold described in the second embodiment may be employed, or the third threshold described in the fourth embodiment may be employed.

(2) It is possible to combine the second to fourth embodiments with the fifth embodiment. For example, in a case where the second embodiment is combined with the fifth embodiment, in the analysis data illustrated in FIG. 14, the analysis data generating unit 113 only needs to calculate the first working period for each image capturing scene and calculate the second working period for each first threshold TH1 for each image capturing scene. Further, in a case where the third embodiment is combined with the fifth embodiment, in the analysis data illustrated in FIG. 18, the analysis data generating unit 113 only needs to calculate the first working period for each image capturing scene and calculate the second working period for each second threshold information TH2 for each image capturing scene. Still further, in a case where the fourth embodiment is combined with the fifth embodiment, in the analysis data illustrated in FIG. 22, the analysis data generating unit 113 only needs to calculate the second working period for each image capturing scene and calculate the second working period for each of the plurality of classes and for each of the plurality of third thresholds TH3 for each image capturing scene.

The present disclosure is useful for efficiently generating learning data.

This application is based on Japanese Patent application No. 2019-150938 filed in Japan Patent Office on Aug. 21, 2019, the contents of which am hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An annotation assisting method in which a computer assists a worker to perform work of setting annotation data to image data, the annotation assisting method comprising:
    first, measuring a first working period when the worker performs first work of setting the annotation data to first image data and recording the first working period in a memory;
    second, measuring a second working period when the worker performs second work of correcting advance annotation data, the advance annotation data indicating a first recognition result obtained by causing a predetermined recognizer to recognize second image data, and recording the second working period in the memory;
    third, comparing the first working period recorded in the memory with the second working period recorded in the memory;
    fourth, determining that the first work is faster than the second work where the first working period is shorter than the second working period;
    fifth, requesting the worker to set the annotation data to third image data in which the advance annotation data is not set when the annotation assisting method determines that the first work is faster than the second work;
    sixth, determining that another second work of correcting advance annotation data indicating a second recognition result obtained by causing the predetermined recognizer to recognize another second image data is faster than the first work where a corresponding another second working period is shorter than the first working period; and
    seventh, requesting the worker to correct the advance annotation data set based on a third recognition result obtained by causing the recognizer to recognize fourth image data when the annotation assisting method determines that the another second work of correcting the advance annotation data indicating the second recognition result obtained by causing the predetermined recognizer to recognize the another second image data is faster than the first work,
    wherein annotated image data is generated by combining a faster one of worker-performed work and recognizer-performed work in a determined order.

2. The annotation assisting method according to claim 1, further comprising:
    determining whether a value of reliability of a recognition result output by the recognizer along with the recognition result is equal to or greater than a first threshold,
    wherein the advance annotation data is set where the value of reliability is equal to or greater than the first threshold,
    in the measurement of the second working period, a plurality of first thresholds are set, and the second working period is measured for each of the plurality of first thresholds and recorded in the memory,
    an optimal value of the first threshold is further determined based on the second working period measured for each of the plurality of first thresholds,
    in the comparing of speed of the first work with speed of the second work, the comparing is based on the second working period corresponding to the optimal value of the first threshold and the first working period, and
    in the request for correction of the advance annotation data, the advance annotation data is set using the optimal value of the first threshold.

3. The annotation assisting method according to claim 1,
    wherein the advance annotation data includes region information corresponding to a recognition target in an image coordinate system of the first image data, the second image data, or the third image data,
    the advance annotation data is set where a size of a region indicated by the region information falls within a range between a lower limit threshold and an upper limit threshold included in second threshold information,
    in the measuring of the second working period, a plurality of pieces of second threshold information are set, and the second working period is measured for each of the plurality of pieces of second threshold information and recorded in the memory,
    the annotation assisting method further comprises determining an optimal value of the second threshold information based on the second working period measured for each of the plurality of pieces of second threshold information recorded in the memory,
    in the comparing of speed of the first work with speed of the second work, the comparing is based on the second working period for the optimal value of the second threshold information and the first working period, and
    in the request for correction of the advance annotation data, the advance annotation data is set using the optimal value of the second threshold information.

4. The annotation assisting method according to claim 2, wherein the optimal value of the first threshold is set for each of a plurality of classes on which the recognizer is to perform recognition.

5. The annotation assisting method according to claim 1,
wherein in the measuring of the first working period, the
first working period is measured for each piece of
image attribute information indicating at least one of an
image capturing scene and image quality and recorded
in the memory,
in the measuring of the second working period, the second
working period is measured for each piece of the image
attribute information and recorded in the memory,
the annotation assisting method further comprises specifying the image attribute information of image data on
which work is to be performed,
specifying a first working period associated with the
specified image attribute information from the first
working period for each piece of the image attribute
information recorded in the memory, and a second
working period associated with the specified image
attribute information from the second working period
for each piece of the image attribute information
recorded in the memory,
determining that the first work is faster than the second
work where the specified first working period is shorter
than the specified second working period,
determining that the second work is faster than the first
work where the specified second working period is
shorter than the specified first working period, and
requesting the worker to set the annotation data to the
image data on which work is to be performed, in which
the advance annotation data is not set, when it is
determined that the first work is faster than the second
work, and requesting the worker to correct the advance
annotation data set based on a recognition result
obtained by causing the recognizer to recognize the
image data on which work is to be performed, when it
is determined that the second work is faster than the
first work.

6. The annotation assisting method according to claim 1,
further comprising:
acquiring a work result of setting of the annotation data to
second image data in which the advance annotation
data is not set; and
acquiring a work result of correction of the advance
annotation data set to the second image data.

7. An annotation assisting device, which assists a worker
to perform work of setting annotation data to image data, the
annotation assisting device comprising:
a processor;
a memory that includes a program, which when executed
by the processor, causes the processor to perform
operations, including
first, measuring a first working period when the worker
performs first work of setting the annotation data to first
image data, and recording the first working period in a
memory;
second, measuring a second working period when the
worker performs second work of correcting advance
annotation data, the advance annotation data indicating
a recognition result obtained by causing a predetermined recognizer to recognize second image data, and
recording the second working period in the memory;
third, comparing the first working period recorded in the
memory with the second working period recorded in
the memory;
fourth, determining that the first work is faster than the
second work where the first working period is shorter
than the second working period;
fifth, requesting the worker to set the annotation data to
third image data in which the advance annotation data
is not set when it is determined that the first work is
faster than the second work;
sixth, determining that the second work is faster than the
first work where the second working period is shorter
than the first working period; and
seventh, requesting the worker to correct the advance
annotation data set based on a recognition result
obtained by causing the recognizer to recognize a
fourth image data when it is determined the second
work is faster than the first work,
wherein annotated image data is generated by combining
the faster of worker-performed work and recognizer-performed work in a determined order.

8. A non-transitory computer readable recording medium
recording an annotation assisting program for causing a
computer to function as an annotation assisting device,
which assists a worker to perform work of setting annotation
data to image data, wherein the non-transitory computer
readable recording medium causes the computer to function
as:
first, measuring a first working period when the worker
performs first work of setting the annotation data to first
image data, and recording the first working period in a
memory;
second, measuring a second working period when the
worker performs second work of correcting advance
annotation data, the advance annotation data indicating
a recognition result obtained by causing a predetermined recognizer to recognize second image data, and
recording the second working period in the memory;
third, comparing the first working period recorded in the
memory with the second working period recorded in
the memory;
fourth, determining that the first work is faster than the
second work where the first working period is shorter
than the second working period;
fifth, requesting the worker to set the annotation data to
third image data in which the advance annotation data
is not set when it is determined that the first work is
faster than the second work;
sixth, determining that the second work is faster than the
first work where the second working period is shorter
than the first working period; and
seventh, requesting the worker to correct the advance
annotation data set based on a recognition result
obtained by causing the recognizer to recognize a
fourth image data when it is determined that the second
work is faster than the first work,
wherein annotated image data is generated by combining
the faster of worker-performed work and recognizer-performed work in a determined order.

* * * * *